(12) United States Patent
Fujita

(10) Patent No.: US 8,781,301 B2
(45) Date of Patent: Jul. 15, 2014

(54) INFORMATION PROCESSING APPARATUS, SCENE SEARCH METHOD, AND PROGRAM

(75) Inventor: Toshihiro Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 258 days.

(21) Appl. No.: 12/909,258

(22) Filed: Oct. 21, 2010

(65) Prior Publication Data

US 2011/0103768 A1     May 5, 2011

(30) Foreign Application Priority Data

Oct. 29, 2009    (JP) ................................ P2009-248590

(51) Int. Cl.
*H04N 5/92* (2006.01)

(52) U.S. Cl.
USPC .......................................................... 386/248

(58) Field of Classification Search
USPC .......................................................... 386/248
See application file for complete search history.

(56) References Cited

U.S. PATENT DOCUMENTS

| | | | | |
|---|---|---|---|---|
| 2006/0075346 A1* | 4/2006 | Lanning et al. | ............... | 715/723 |
| 2007/0127735 A1* | 6/2007 | Miura et al. | ................... | 381/87 |
| 2007/0265842 A1* | 11/2007 | Jarvinen et al. | ............... | 704/214 |
| 2008/0037799 A1* | 2/2008 | Yarygin et al. | .................. | 381/63 |
| 2009/0228422 A1* | 9/2009 | Yen et al. | ......................... | 706/52 |
| 2010/0011388 A1* | 1/2010 | Bull et al. | .......................... | 725/9 |
| 2010/0040342 A1* | 2/2010 | Kemp et al. | ..................... | 386/65 |
| 2011/0283865 A1* | 11/2011 | Collins | ........................ | 84/464 R |

FOREIGN PATENT DOCUMENTS

JP     2008-276340     11/2008

\* cited by examiner

*Primary Examiner* — Thai Tran
*Assistant Examiner* — William Tran
(74) *Attorney, Agent, or Firm* — Oblon, Spivak, McClelland, Maier & Neustadt, L.L.P.

(57) ABSTRACT

An information processing apparatus includes an obtaining unit, a specifying unit, a search processing unit, and an output unit. The obtaining unit obtains at least one content including a sound. The specifying unit receives a specification for specifying sound information, the sound information being in relation with an icon symbolizing a scene content and expressing the scene content, as a scene search condition. The search processing unit compares the sound information, the specification for specifying the sound information being received as the scene search condition, with the sound included in the at least one content, to thereby search a content including the sound information in the sound. The output unit outputs information on the content searched by the search processing unit.

16 Claims, 20 Drawing Sheets

| Sound unit component | Sound wave shape pattern |
|---|---|
| N | ..... |
| a | ..... |
| a: | ..... |
| ba | ..... |
| ba: | ..... |
| be | ..... |
| be: | ..... |
| bi | ..... |
| bi: | ..... |
| bo | ..... |
| bo: | ..... |
| bu | ..... |
| bu: | ..... |
| bya | ..... |

| | |
|---|---|
| zu: | ..... |
| silB | ..... |
| silE | ..... |
| sp | ..... |

FIG.3

| Scene icon ID | Direction word | Synonymous sound | Synonymous sound | Synonymous sound | Synonymous sound | Synonymous sound | ... |
|---|---|---|---|---|---|---|---|
| ...... | Surprise | Kidding | Really | Wow | Zowie | Boy | |
| ...... | Laughter | Ha-ha | Haw-haw | Funny | Tee-hee-hee | He-he-he | |
| ...... | Delicious | Tasty | Good | Yummy | Yum-yum | Mmm | |

FIG.6

INFORMATION PROCESSING APPARATUS, SCENE SEARCH METHOD, AND PROGRAM

BACKGROUND OF THE INVENTION

1. Field of the Invention

The present invention relates to an information processing apparatus, a scene search method, and a program for searching a content including a desired scene based on sound information.

2. Description of the Related Art

There is disclosed a technique in which data of contents including sounds and images such as television broadcast programs or programs delivered via a network are accumulated, and a scene of an attribute desired by a user is searched from the accumulated one or more contents based on sound information as a search condition (See, for example, Japanese Patent Application Laid-open No. 2008-276340, paragraphs 0037 and 0046, and FIG. 3) (hereinafter, referred to as Patent Document 1). In the technique of this kind, as the scene search condition, a text input with a keyboard, sound signals input with a microphone, or the like is used.

SUMMARY OF THE INVENTION

In a case of inputting a text using a keyboard or a sound using a microphone as the scene search condition, a user is required to decide and input a precise keyword symbolizing a scene of a desired attribute. That is, there is a variation in keywords that users intuitively think of as words most symbolizing the scene of the desired attribute. So in a case where a user specifies a keyword without keeping that in mind, a preferable search result cannot be obtained. Further, in a case of searching a scene in which a cast is surprised at something, for example, a user may input a keyword "Surprise" as the search condition. However, in a surprise scene in an actual program, a cast may not always utter the word "Surprise", but often utters exclamations such as "Oh" or "Augh". Accordingly, in order to reduce leaks of searches, a user is required to input keywords as many kinds as possible. So a burden of a user is increased, which is problematic. Further, inputting many kinds of keywords in a text or sound increases a burden of a user, which is problematic. In addition, increase of the number of keywords more than necessary increases time required to the search processing, which is a harmful effect.

In view of the above-mentioned circumstances, it is desirable to provide an information processing apparatus, a scene search method, and a program capable of searching a scene of a desired attribute in a content easily and with high accuracy.

According to an embodiment of the present invention, there is provided an information processing apparatus including an obtaining unit, a specifying unit, a search processing unit, and an output unit.

The obtaining unit obtains at least one content including a sound.

The specifying unit receives a specification for specifying sound information, the sound information being in relation with an icon symbolizing a scene content and expressing the scene content, as a scene search condition.

The search processing unit compares the sound information, the specification for specifying the sound information being received as the scene search condition, with the sound included in the at least one content, to thereby search a content including the sound information in the sound.

The output unit outputs information on the content searched by the search processing unit.

According to the information processing apparatus, sound information in relation with an icon symbolizing a scene content and expressing the scene content is specified by a user as a scene search condition, and a scene search is performed. So a variation in determining sound information being the scene search condition by a user is not generated, and a scene of a desired attribute can be searched with high accuracy.

The specifying unit may be an icon selection unit to display an icon and to receive a predetermined operation with respect to the icon from a user as an instruction of the search with respect to the search processing unit and as an instruction of the sound information to be the search condition with respect to the sound by the search processing unit.

According to the information processing apparatus, a user can select sound information being the search condition through displayed icons. Accordingly, the user can select the sound information more intuitively.

The icon selection unit may display a plurality of icons symbolizing different scene contents, respectively.

According to the information processing apparatus, a desired scene can be searched out of the plurality of scene contents respectively symbolized by the plurality of icons.

The information processing apparatus may further include a sound information generating unit to generate second sound information synonymous with first sound information, the first sound information being the sound information instructed by the icon selection unit.

The search processing unit may search a content including, in the sound, at least one item of sound information out of the first sound information instructed by the icon selection unit and at least one item of the second sound information.

According to the information processing apparatus, the scene search can be performed based on a plurality of kinds of sound information without increasing a burden of a user.

The search processing unit may determine a time position of the sound corresponding to the at least one item of sound information in the content.

The output unit may output the information on the content and information on the time position.

According to the information processing apparatus, a search result including a time position of a searched scene can be shown to a user. Because the user can understand the time position, the user can instruct the time position in inputting an instruction to reproduce a content. So a predetermined scene can be reproduced promptly.

The specifying unit may be a setting unit to previously set the sound information as the scene search condition.

According to the information processing apparatus, sound information being the scene search condition can be previously set by a user, so, right after obtaining a content, the scene search processing can be performed. Further, by accumulating the scene search results, when a user wishes to refer to the search result, the user can refer to the search result promptly.

The information processing apparatus may further include a sound information generating unit to generate second sound information synonymous with first sound information, the first sound information being the sound information set by the setting unit.

The search processing unit may search a content including, in the sound, at least one item of sound information out of the first sound information set by the setting unit and at least one item of the second sound information.

According to the information processing apparatus, the scene search can be performed based on a plurality of kinds of sound information without increasing a burden of a user.

The output unit may generate first display information by using the information on the at least one content and image information on the icon symbolizing the scene content expressed by the sound information included in the sound in the content, and output the first display information.

According to the information processing apparatus, content information and an icon image symbolizing the scene content can be displayed in combination. So, in displaying which content includes which scene content, a user can understand that more intuitively.

The search processing unit may determine a time position of the sound corresponding to the sound information in the content.

The output unit may generate second display information by using the information on the content, information on the time position, and the image information on the icon symbolizing the scene content expressed by the sound information, and output the second display information.

According to the information processing apparatus, content information, information on the time position of the scene, and an icon image symbolizing the scene content can be displayed in combination. So, in displaying which scene content appears in which time position in a content, a user can understand that more intuitively.

The output unit may output the information on the at least one content and information identifying the icon symbolizing the scene content expressed by the sound information included in the sound in the content.

According to the information processing apparatus, it is effective in a case where a terminal apparatus receiving an output from the information processing apparatus holds image information of an icon. That is, because the information processing apparatus transmits identification information on an icon to the information terminal, compared to the case of transmitting image information on an icon, the total data transfer amount can be reduced.

The search processing unit may determine a time position of the sound corresponding to the sound information in the content.

The output unit may output the information on the content, information on the time position, and information identifying the icon symbolizing the scene content expressed by the sound information.

According to the information processing apparatus, there can be generated display information in which content information, information on the time position of the scene, and an icon image symbolizing the scene content are in combination. So, in displaying which scene content appears in which time position in a content, a user can understand that more intuitively.

According to an embodiment of the present invention, there is provided a scene search method, including: obtaining, by an obtaining unit, at least one content including a sound; receiving, by a specifying unit, a specification for specifying sound information, the sound information being in relation with an icon symbolizing a scene content and expressing the scene content, as a scene search condition; comparing, by a search processing unit, the sound information, the specification for specifying the sound information being received as the scene search condition, with the sound included in the at least one content, to thereby search a content including the sound information in the sound; and outputting, by an output unit, information on the content searched by the search processing unit.

According to an embodiment of the present invention, there is provided a program causing a computer to execute: a step of obtaining, by an obtaining unit, at least one content including a sound; a step of receiving, by a specifying unit, a specification for specifying sound information, the sound information being in relation with an icon symbolizing a scene content and expressing the scene content, as a scene search condition; a step of comparing, by a search processing unit, the sound information, the specification for specifying the sound information being received as the scene search condition, with the sound included in the at least one content, to thereby search a content including the sound information in the sound; and a step of outputting, by an output unit, information on the content searched by the search processing unit.

According to the information processing apparatus, the scene search method, and the program capable of the embodiments of the present invention, a scene of a desired attribute in a content can be searched easily and with high accuracy.

These and other objects, features and advantages of the present invention will become more apparent in light of the following detailed description of best mode embodiments thereof, as illustrated in the accompanying drawings.

BRIEF DESCRIPTION OF DRAWINGS

FIG. 3 is a diagram showing a structure of a sound unit component table;

FIG. 6 is a diagram showing a structure of a thesaurus dictionary;

DESCRIPTION OF PREFERRED EMBODIMENTS

Hereinafter, embodiments of the present invention will be described with reference to the drawings.

First Embodiment

Hardware Configuration of Information Terminal 1

Figure 1:
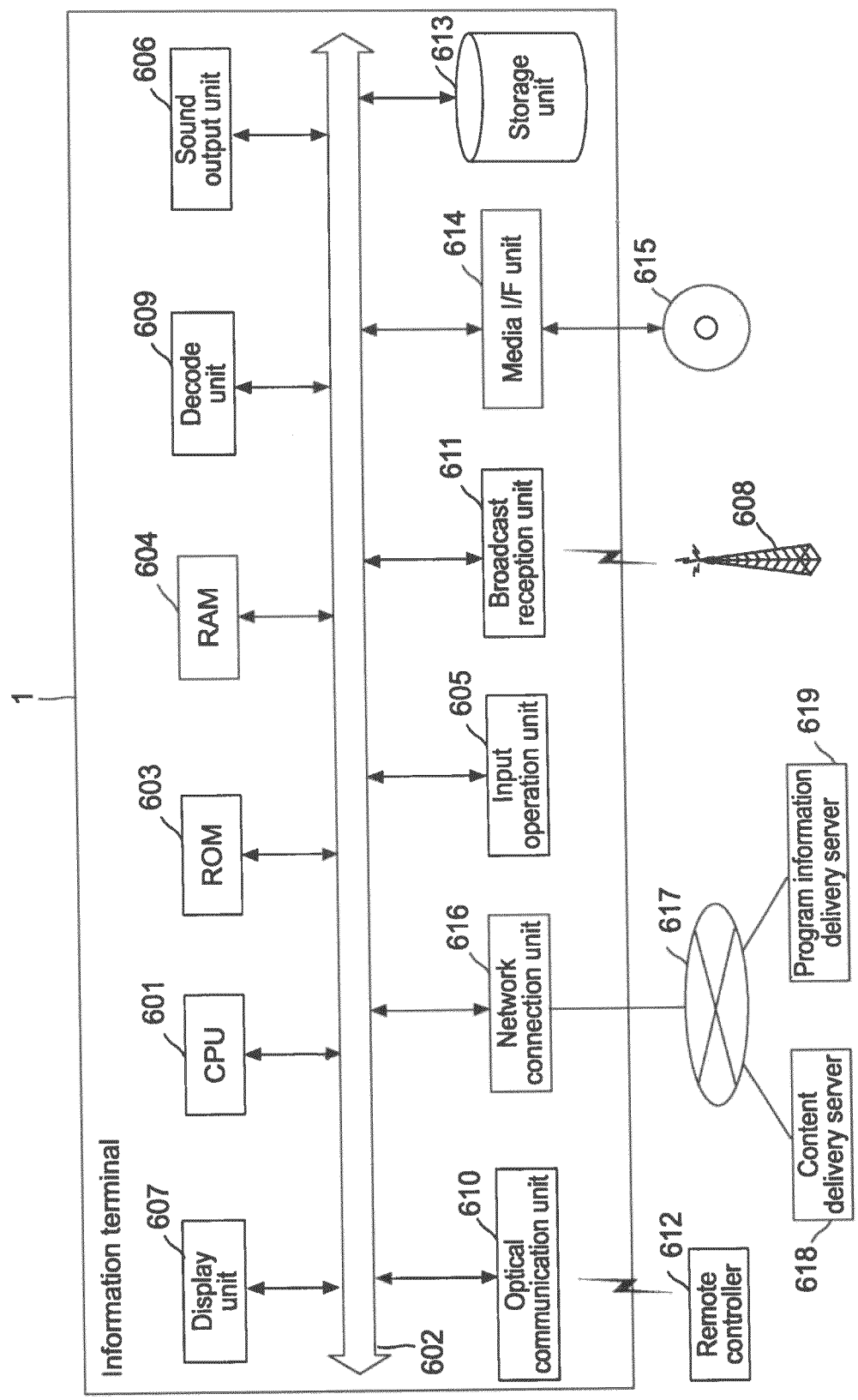
FIG. 1 is a block diagram showing a hardware configuration of an information terminal according to a first embodiment of the present invention.

FIG. 1 is a block diagram showing a hardware configuration of an information terminal 1 according to an embodiment of the present invention.

In this embodiment, the information terminal 1 as an information processing apparatus is capable of recording and reproducing content data such as broadcast programs constantly broadcasted from broadcast stations such as terrestrial digital television broadcasting, CS digital broadcasting, and BS digital broadcasting. Alternatively, the information terminal 1 is capable of obtaining, recording, and reproducing content data delivered via IP multicast. As the information terminal 1, a television-dedicated information processing apparatus, a personal computer for driving an application to reproduce videos, and the like are employed.

In the information terminal 1, a ROM (Read Only Memory) 603, a RAM (Random Access Memory) 604, an input operation unit 605, a sound output unit 606, a display unit 607, a decode unit 609, an optical communication unit 610, a broadcast reception unit 611, a storage unit 613, a media interface unit 614, and a network connection unit 616 are connected to a CPU (Central Processing Unit) 601 via a system bus 602.

The input operation unit 605 includes various keys. The input operation unit 605 processes various orders and data input by a user. The various orders input by a user through the input operation unit 605 are supplied to the CPU 601 by an interface unit (not shown) via the system bus 602.

The broadcast reception unit 611 receives transport streams broadcasted from broadcast stations 608 such as terrestrial digital television broadcasting, CS digital broadcasting, and BS digital broadcasting.

The network connection unit 616 processes connection with a network 617. The network connection unit 616 receives transport streams delivered from a content delivery server 618 connected to the information terminal 1 via the network 617. Further, the network connection unit 616 receives program information from a program information delivery server 619 connected to the information terminal 1 via the network 617.

The storage unit 613 is, for example, an HDD (Hard Disk Drive). The storage unit 613 stores content data such as broadcast programs received by the broadcast reception unit 611 and the like.

The decode unit 609 decodes content data read from the storage unit 613 and reconstructs digital video data and digital audio data. The reconstructed digital video data is supplied to the display unit 607 via the system bus 602. The reconstructed digital audio data is supplied to the sound output unit 606 via the system bus 602.

The display unit 607 includes a display device having a display panel such as an LCD (Liquid Crystal Display), a display control circuit for driving the display device, and the like. The display unit 607 displays the digital video data reconstructed and supplied by the decode unit 609 on the display panel. Further, the display unit 607 displays confirmation of instructions and data input by a user, various statuses, and the like.

The sound output unit 606 includes a circuit for converting a digital sound signal to an analog sound signal, a speaker, and the like. The sound output unit 606 outputs the digital audio data reconstructed and supplied by the decode unit 609 as sounds. Note that, in the specification, the term "sound(s)" includes sounds such as environmental sounds, human voices, and the mixture thereof.

A removal media 615 such as an optical disk can be inserted into the media interface unit 614. Content data such as broadcast programs can be recorded in the removal media 615. A recordable or rewritable DVD (Digital Versatile Disc), a Blu-ray Disc (registered trademark), or the like is employed as the removal media 615.

The optical communication unit 610 is an interface for processing interactive communication with an external device such as a remote controller 612. Specifically, the optical communication unit 610 performs communication with the external device via lights such as infrared lights being a wireless media. Other than lights, the optical communication unit 610 may use other wireless media such as radio waves, sound waves, and electromagnetic waves.

The ROM 603 is a read only memory in which programs and data for software processing to be executed by the information terminal 1 are permanently stored. Note that the programs may be stored in the storage unit 613 alternatively.

The RAM 604 is a writable volatile memory in which program codes executed by the CPU 601 is loaded or operation data of programs is written.

The CPU 601 controls the overall units of the information terminal 1 and controls data exchange between the units. The CPU 601 loads, in order to execute software processing to be executed by the information terminal 1, required programs from the ROM 603 to the RAM 604, and interprets and executes the programs.

(Software Configuration of Information Terminal 1)

Next, a description will be given on a software configuration of the information terminal 1.

Figure 2:
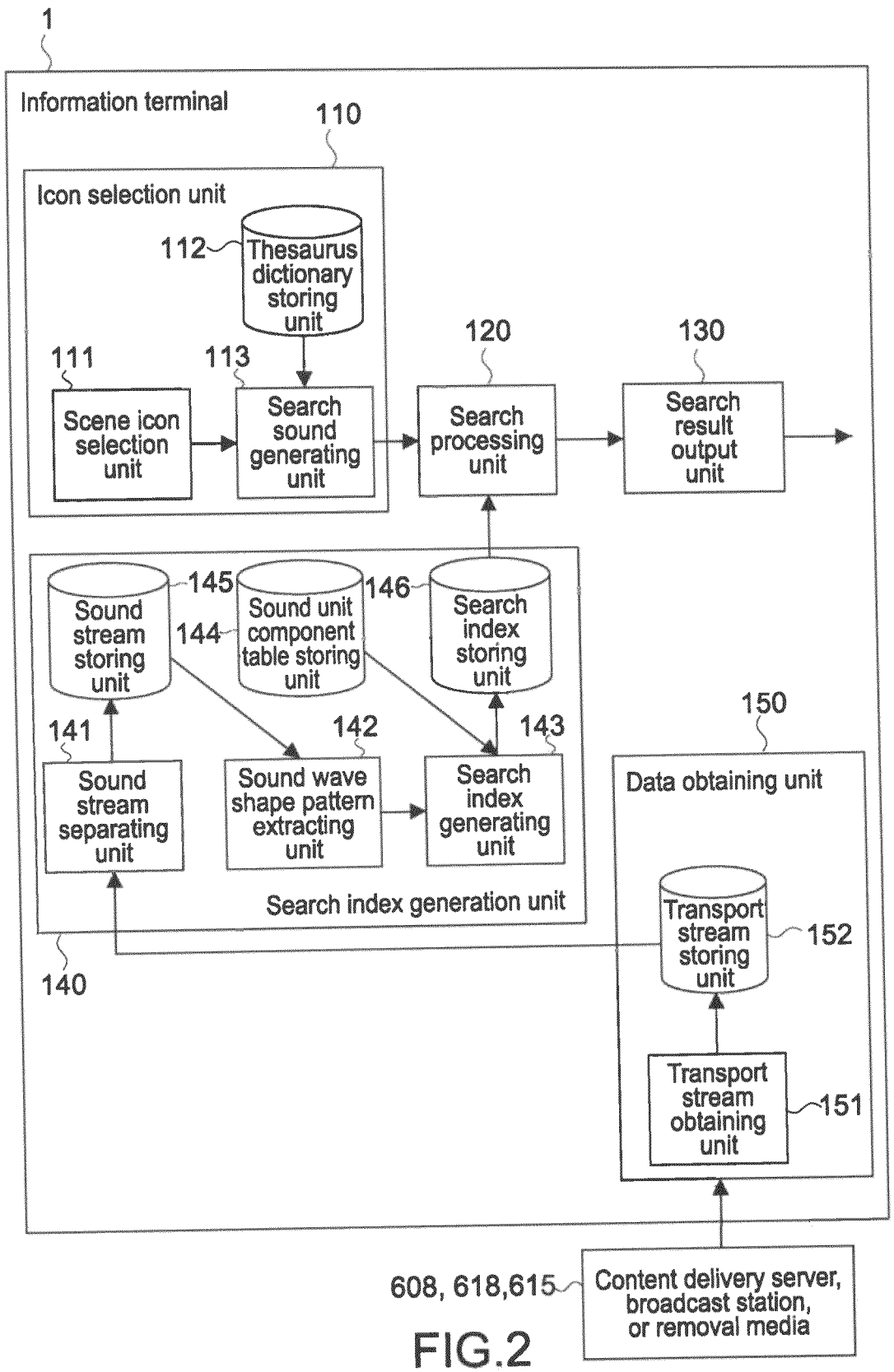
FIG. 2 is a block diagram showing a software configuration of the information terminal of FIG. 1.

FIG. 2 is a block diagram showing a software configuration of the information terminal 1.

The information terminal 1 includes an icon selection unit 110 (specifying unit), a search processing unit 120, a search result output unit 130, a search index generation unit 140, and a data obtaining unit 150. Note that the following storing units of the information terminal 1 are set to the storage unit 613, the removal media 615 inserted into the media interface unit 614, and the like.

(Configuration of Data Obtaining Unit 150)

The data obtaining unit 150 includes a transport stream obtaining unit 151 and a transport stream storing unit 152.

The transport stream obtaining unit 151 selectively obtains a transport stream of a program content and the like delivered from the content delivery server 618 via the network 617, broadcasted from the broadcast stations 608, or recorded in the removal media 615, and stores the transport stream in the transport stream storing unit 152. Here, the transport stream includes a video stream, a sound stream of the video, and the like having been multiplexed. The transport stream obtaining unit 151 generates a content list based on a program title of the stored transport stream, program information such as a name of the content delivery server 618 or the broadcast station 608 and delivery date and time, a content title in the media 615, and the like, and stores the content list in the transport stream storing unit 152. The transport stream obtaining unit 151 generates, with respect to the stored transport stream, a content ID uniquely identifying the transport stream. The transport stream obtaining unit 151 additionally stores the content ID in the transport stream storing unit 152 in relation with the corresponding content information recorded in the content list.

(Configuration of Search Index Generation Unit 140)

The search index generation unit 140 includes a sound stream separating unit 141, a sound wave shape pattern extracting unit 142, a search index generating unit 143, a sound unit component table storing unit 144, a sound stream storing unit 145, and a search index storing unit 146.

The sound stream separating unit 141 separates a sound stream from the transport stream stored in the transport stream storing unit 152. The sound stream separating unit 141 stores the sound stream in relation with a content ID of the transport stream recorded in the content list in the sound stream storing unit 145.

The sound wave shape pattern extracting unit 142 converts the sound stream stored in the sound stream storing unit 145 to a sound wave shape pattern. The sound wave shape pattern expresses, in a shape pattern, a sound sequence whose frequency and level change in accordance with time. Note that, in the following description, the sound wave shape pattern converted by the sound wave shape pattern extracting unit 142 is referred to as "conversion sound wave shape pattern". The sound wave shape pattern extracting unit 142 supplies, together with the conversion sound wave shape pattern, the content ID in relation with the sound stream before conversion to the search index generating unit 143.

The sound unit component table storing unit 144 stores a sound unit component table. The sound unit component table is a correspondence table of sound unit component information being information for identifying a unit component of a sound and a sound wave shape pattern. The "unit component of a sound" is a sound stream made of a combination of one or more phonemes.

FIG. 3 is a diagram showing a structure of a sound unit component table 144*a*.

As shown in FIG. 3, the sound unit component table 144*a* is structured such that each sound unit component information 144*b* is in relation with a sound wave shape pattern 144*c* expressing a unit component of each sound. Note that, in the example of FIG. 3, the sound wave shape pattern 144*c* for each sound unit component of a language is registered, but not limited to the above. The sound wave shape pattern 144*c* of environmental sounds or the like may be registered.

The search index generating unit 143 performs matching of the conversion sound wave shape pattern supplied from the sound wave shape pattern extracting unit 142 and each sound wave shape pattern registered in the sound unit component table 144*a*, to determine sound unit components in the conversion sound wave shape pattern. Further, the search index generating unit 143 determines a start time position and an end time position of the conversion sound wave shape pattern corresponding to each determined sound unit component on a time axis of the sound stream. Further, the search index generating unit 143 calculates a score, which is a value of probability of the determination result of the sound unit component with respect to the conversion sound wave shape pattern. Then, the search index generating unit 143 stores information in which the determined sound unit component, the start time position, the end time position, and the score are in relation with each other in the search index storing unit 146 as a search index 143*a*. The search index 143*a* is generated for each sound stream. Further, the search index generating unit 143 stores the relationship of the search index 143*a* generated for each sound stream and the content ID of the sound stream in the search index storing unit 146. Note that in the following description, the time position will be simply referred to as "position".

Figure 4:
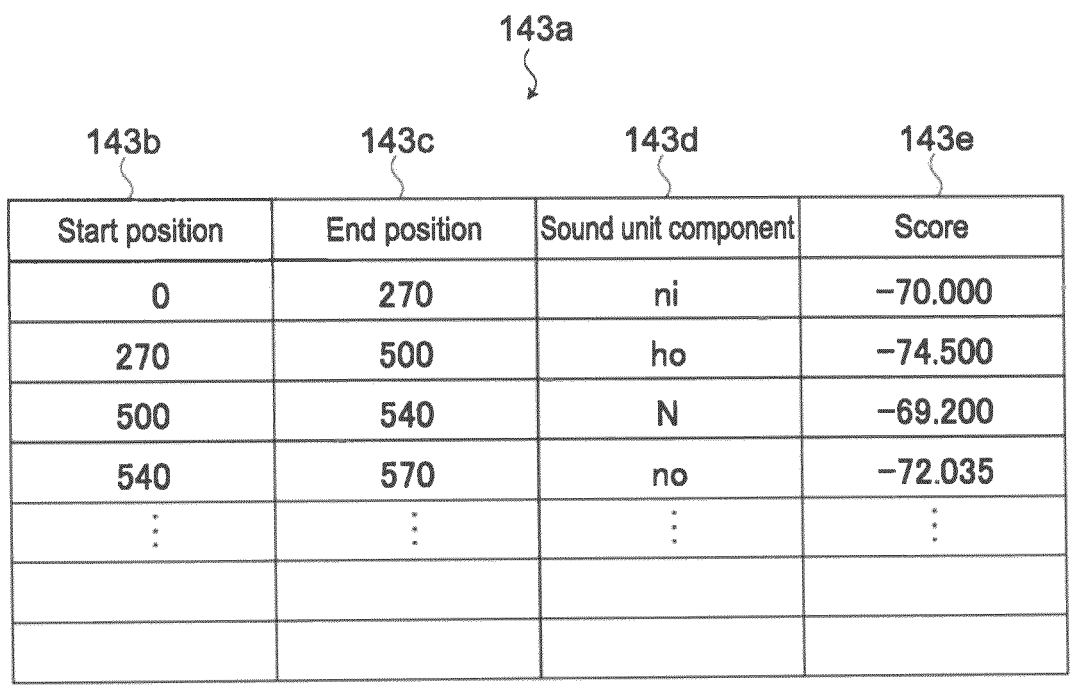
FIG. 4 is a diagram showing a structure of a search index.

FIG. 4 is a diagram showing a structure of the search index 143*a*.

The search index 143*a* is a correspondence table of start position information 143*b*, end position information 143*c*, sound unit component information 143*d*, and a score 143*e*. In the example of FIG. 4, in the search index 143*a*, the start position of the sound unit component "ni" on the time axis of the sound stream is 0 msec (millisecond), the end position is 270 msec, and the score is −70.000. In this manner, in the search index 143*a*, the sound unit components 143*d* "ni", "ho", "N", and "no", identifying correspondence to the string of the unit components of sounds "ni ho N no", are aligned in the order of the start position and registered. Note that the score of the sound wave shape pattern registered in the sound unit component table is set to 0. As the absolute value of the score is larger, the pattern is more different from the sound wave shape pattern registered in the sound unit component table.

(Configuration of Icon Selection Unit 110)

The icon selection unit 110 includes a scene icon selection unit 111, a thesaurus dictionary storing unit 112, and a search sound generating unit 113 (sound information generating unit).

The scene icon selection unit 111 displays a selection window including a plurality of dingbats (hereinafter referred to as "scene icons") symbolizing different scene contents, respectively, and direction words on a display panel of the display unit 607 to show them a user, causes the user to select a scene icon corresponding to a desired scene content thereamong, and receives the selection result. The direction word expresses the scene content, which the scene icon symbolizes, in a manner of a character string, the scene icons symbolizing different scene contents, respectively.

Figure 5:
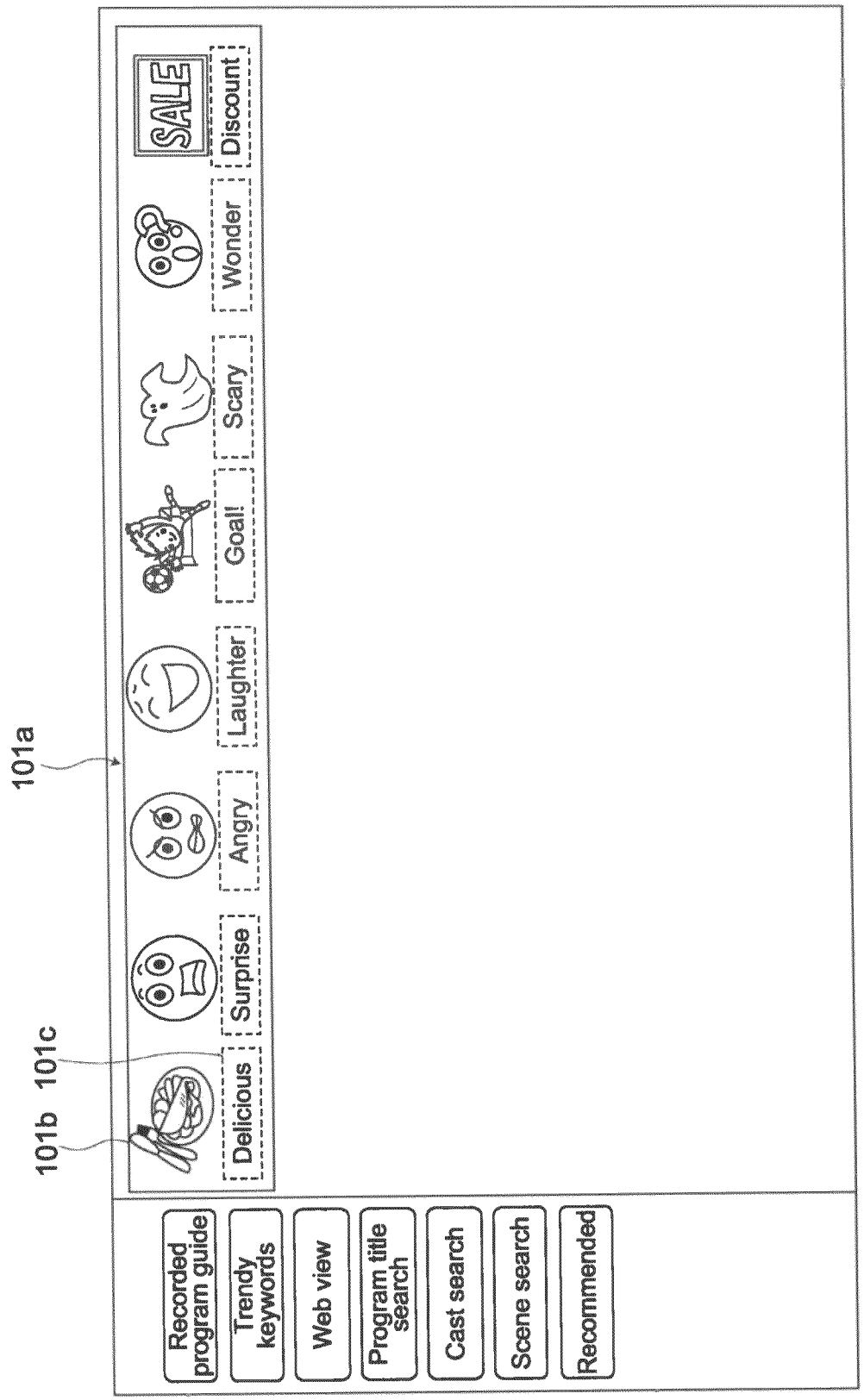
FIG. 5 is a diagram showing a scene search window.

FIG. 5 is a diagram showing a scene search window 101*a*.

In FIG. 5, on the scene search window 101*a*, for example, a scene icon 101*b* symbolizing a "delicious scene" and a character string "Delicious" in relation therewith as a direction word 101*c* are displayed. A user selects the scene icon 101*b* symbolizing a desired scene content by using the input operation unit 605. Receiving the selection of the scene icon 101*b* by the user, the scene icon selection unit 111 determines a scene icon ID in relation with the selected scene icon previously, to supply to the search sound generating unit 113.

The thesaurus dictionary storing unit 112 stores a thesaurus dictionary 112*a*.

The thesaurus dictionary 112*a* is structured such that information on a scene icon, direction word information (first sound information), and one or more items of synonymous sound information (second sound information) are registered in relation with each other. The information on a scene icon is information for identifying the scene icon. The direction word information is sound information expressing a direction word, which expresses a scene content symbolized by a corresponding scene icon with a character string, with sound unit component information. The synonymous sound information is sound information expressing another character string, which expresses the scene content expressed by the direction word, with sound unit component information. For example, the synonymous sound information includes sound information expressing a character string, which expresses a semantic content similar to that of the direction word, with sound unit component information.

FIG. 6 is a diagram showing a structure of the thesaurus dictionary 112*a*.

In FIG. 6, a scene icon ID 112b capable of uniquely identifying each of the scene icons is previously in relation with each of the scene icons. Further, for example, in relation with the scene icon ID 112b capable of uniquely identifying the scene icon symbolizing the "delicious scene", there is registered direction word information 112c expressing a direction word "Delicious", which expresses a scene content symbolized by the scene icon with a character string, with sound unit component information. Further, in relation with the scene icon ID 112b capable of uniquely identifying the scene icon symbolizing the "delicious scene", there are registered one or more items of synonymous sound information 112d respectively expressing one or more other character strings "Tasty", "Good", and the like, each of which expresses the scene content expressed by the direction word "Delicious" expressed by the direction word information 112c registered in relation, with sound unit component information. Note that the direction word and synonymous sound information is not limited to that expressed with sound unit component information, but may be expressed in a text format. Further, the synonymous sound information 112d is not limited to linguistic sound information such as "Tasty" and "Good". For example, environmental sounds during cooking may be registered as the synonymous sound information 112d expressing the scene content expressed by the direction word "Delicious".

The search sound generating unit 113 extracts direction word information corresponding to a scene icon ID previously in correspondence with a scene icon selected by a user through the scene icon selection unit 111, and one or more items of synonymous sound information from the thesaurus dictionary 112a, and supplies the direction word information and the one or more items of synonymous sound information together with the scene icon ID to the search processing unit 120.

(Configuration of Search Processing Unit 120)

The search processing unit 120 compares the direction word information (first sound information) and one or more items of synonymous sound information (second sound information) supplied from the search sound generating unit 113 with the search index 143a for each sound stream stored in the search index storing unit 146, and searches a sound stream including the sound information. Specifically, the search processing unit 120 compares a string of sound unit components forming a direction word with an array of sound unit components in the time order in the field of the sound unit component in the search index 143a, and searches an array of sound unit components satisfying a predetermined degree of coincidence in the search index 143a. The search processing unit 120 extracts, from the search index 143a, start position information corresponding to an initial sound unit component in the array of sound unit components searched from the search index 143a. Further, the search processing unit 120 calculates a score, which is a value of probability of the determination result of the sound unit component with respect to the conversion sound wave shape pattern, of the sound unit components searched from the search index 143a. For example, the score is a value of a total of absolute values of scores of the sound unit components searched from the search index 143a divided by the number of the sound unit components in the array. The search processing unit 120 supplies, together with the start position information extracted from the search index 143a and the score obtained by the calculation, the content ID in relation with the sound stream before conversion to the search result output unit 130.

Similarly, the search processing unit 120 compares a string of sound unit components forming one synonymous sound out of one or more synonymous sounds with an array of sound unit components in the time order in the field of the sound unit component in the search index 143a, and searches an array of sound unit components satisfying a predetermined degree of coincidence in the search index 143a. The search processing unit 120 extracts, from the search index 143a, start position information corresponding to an initial sound unit component in the array of sound unit components searched from the search index 143a. Further, the search processing unit 120 calculates a score, which is a value of probability of the determination result of the sound unit component searched from the search index 143a. The search processing unit 120 supplies, together with the start position information extracted from the search index 143a and the score obtained by the calculation, the content ID in relation with the sound stream before conversion to the search result output unit 130.

The search processing unit 120 repeats the above-mentioned processing with respect to all the one or more items of synonymous sound information supplied from the search sound generating unit 113. Finishing the above-mentioned processing with respect to the direction word information and all the one or more items of synonymous sound information supplied from the search sound generating unit 113, the search processing unit 120 then performs the chain of processing with respect to the search index 143a of a sound stream in relation with a different content ID. The search processing unit 120 performs the chain of processing with respect to all the search indexes 143a of sound streams respectively in relation with different content IDs.

(Configuration of Search Result Output Unit 130)

The search result output unit 130 extracts, based on the content ID supplied from the search processing unit 120, the program title, the content title in the removal media 615, and the program information such as a name of the content delivery server 618 or the broadcast station 608 and delivery date and time, which are stored in the transport stream storing unit 152 in relation with the content ID. The search result output unit 130 extracts, for example, the start position information on one or more scenes based on the content ID and the score, which is a value of probability of the determination result of the sound unit component supplied from the search processing unit 120. The search result output unit 130 outputs the content ID supplied from the search processing unit 120, the content information stored in the transport stream storing unit 152 in relation with the content ID, and the start position information on one or more scenes.

The display unit 607 displays a scene search result window 130a on the display panel of the display unit 607 based on the information output from the search result output unit 130. The scene search result window 130a is a window in which, for example, icons respectively in relation with one or more scenes, a start position of a scene of the smallest score, and program information are displayed in relation with each other.

Figure 7:
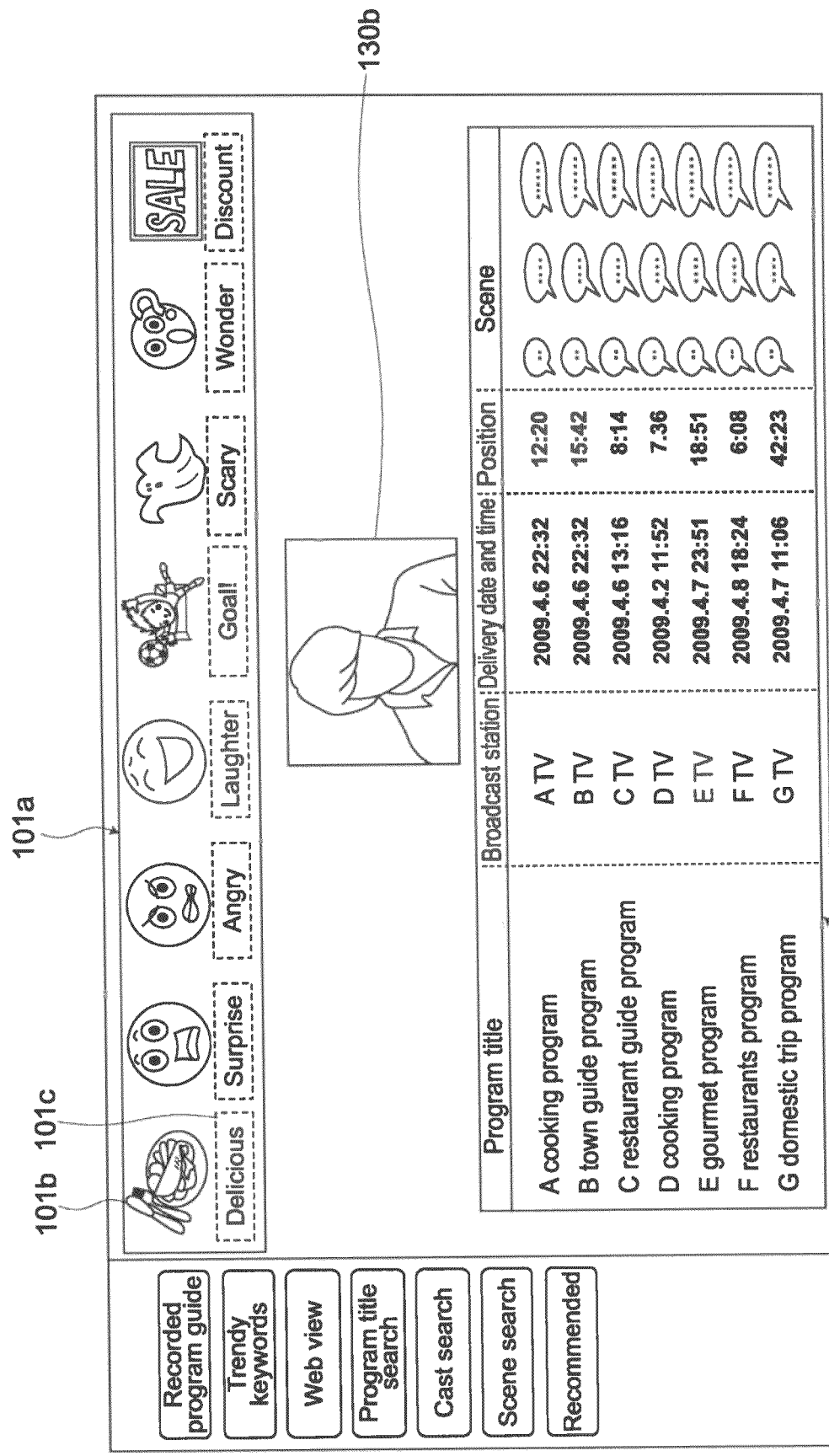
FIG. 7 is a diagram showing a scene search result window.

FIG. 7 is a diagram showing the scene search result window 130a.

In FIG. 7, on the scene search result window 130a, there are displayed the program title "A cooking program", the name "A TV (television)" of the content delivery server 618 or the broadcast station 608, and the delivery date and time "2009.4.6 22:32" being program information, the start position "12:20" of a scene of the smallest score, and icons respectively in relation with one or more scenes, which are in relation with a predetermined content ID.

Further, in a case where one icon displayed on the scene search result window 130a is selected by a user, the search result output unit 130, for example, may search a transport stream of a predetermined length from the transport stream storing unit 152 based on the start position information on a scene in relation with the selected icon, and may output the transport stream so as to be displayed on the display panel of the display unit 607 as a thumbnail 130b.

(Operations of Information Terminal 1)

Next, a description will be given on operations of the information terminal 1. The description on the operations will be given in the following order.

(1) Operations of generating search index
(2) Operations of scene search (Operations of Generating Search Index)

A description will be given on (1) operations of generating search index.

Figure 8:
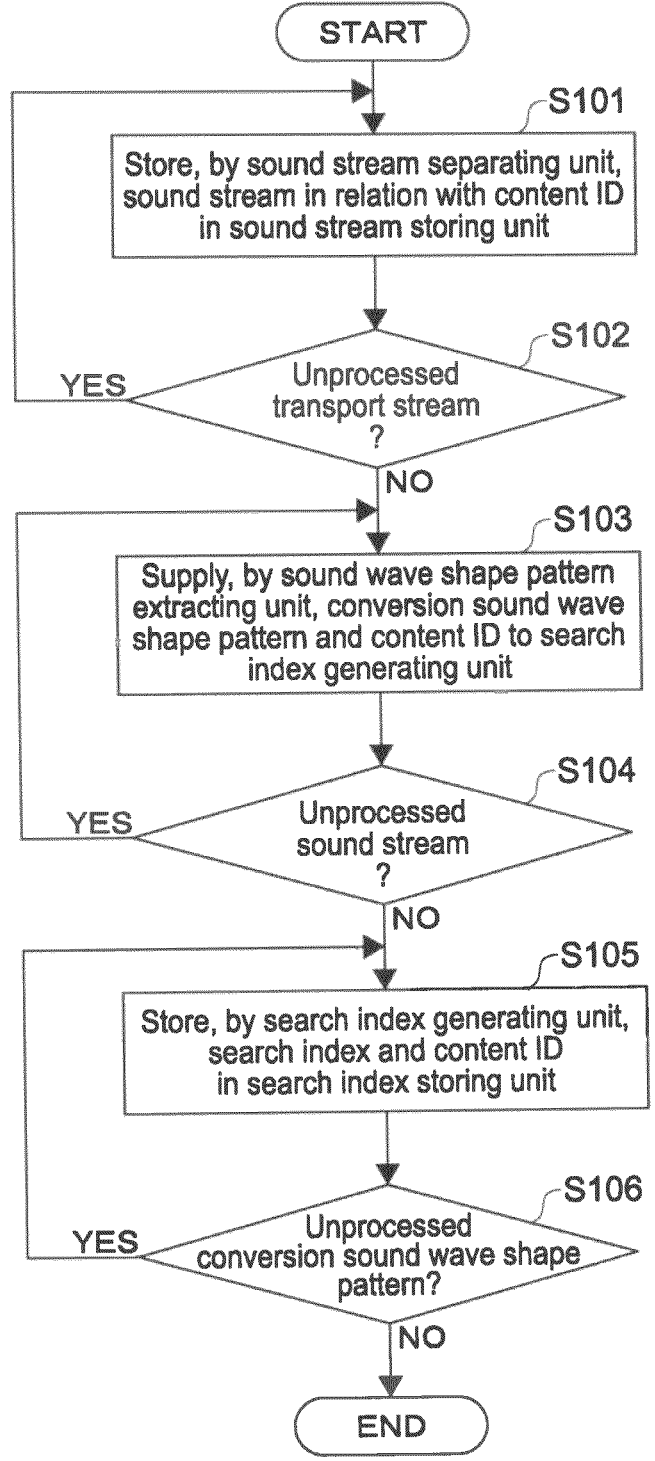
FIG. 8 is a flowchart showing operations of generating search index.

FIG. 8 is a flowchart showing operations of generating search index.

First, the sound stream separating unit 141 separates a sound stream from the transport stream stored in the transport stream storing unit 152. The sound stream separating unit 141 stores the sound stream in relation with a content ID of the transport stream stored in the content list in the sound stream storing unit 145 (Step S101). The sound stream separating unit 141 repeats this processing for each transport stream stored in the transport stream storing unit 152 (Yes in Step S102). The sound stream separating unit 141 performs this processing for all the transport streams stored in the transport stream storing unit 152 (No in Step S102).

Next, the sound wave shape pattern extracting unit 142 converts the sound stream stored in the sound stream storing unit 145 to a sound wave shape pattern. The sound wave shape pattern extracting unit 142 supplies, together with the conversion sound wave shape pattern, the content ID in relation with the sound stream before conversion to the search index generating unit 143 (Step S103). The sound wave shape pattern extracting unit 142 repeats this processing for each sound stream stored in the sound stream storing unit 145 (Yes in Step S104). The sound wave shape pattern extracting unit 142 performs this processing for all the sound streams stored in the sound stream storing unit 145 (No in Step S104).

Next, the search index generating unit 143 performs matching of the conversion sound wave shape pattern supplied from the sound wave shape pattern extracting unit 142 and each sound wave shape pattern registered in the sound unit component table 144a, to determine sound unit components in the conversion sound wave shape pattern. Further, the search index generating unit 143 determines a start position and an end position of the conversion sound wave shape pattern corresponding to each determined sound unit component on a time axis of the sound stream. Further, the search index generating unit 143 calculates a score, which is a value of probability of the determination result of the sound unit component with respect to the conversion sound wave shape pattern. Then, the search index generating unit 143 stores information in which the determined sound unit component, the start position, the end position, and the score are in relation with each other in the search index storing unit 146 as the search index 143a. The search index 143a is generated for each sound stream. Further, the search index generating unit 143 stores the relationship of the search index 143a generated for each sound stream and the content ID of the sound stream in the search index storing unit 146 (Step S105). The search index generating unit 143 performs this processing for each sound stream (Yes in Step S106). The search index generating unit 143 performs this processing for all the conversion sound wave shape patterns supplied from the sound wave shape pattern extracting unit 142 (No in Step S106).

In this manner, the search index storing unit 146 stores the search index 143a for each sound stream, and the relationship between the search index 143a and the content ID of the sound stream. The chain of operations of Step S101 to Step S106 may be performed every time a transport stream is stored in the transport stream storing unit 152. Alternatively, the butch of operations may be performed when information processing amount of the information terminal 1 is small in accordance with a previously-determined schedule. For example, a plurality of transport streams may be stored in the transport stream storing unit 152 in order, and the search indexes 143a may be generated from the transport streams during a broadcast downtime to be stored in the search index storing unit 146. Alternatively, a predetermined amount of sound streams may be stored in the sound stream storing unit 145 (Step S101 to Step S112), and the operations of Step S103 to Step S106 may be performed for each predetermined amount of sound streams.

(Operations of Scene Search)

A description will be given on (2) operations of scene search.

Figure 9:
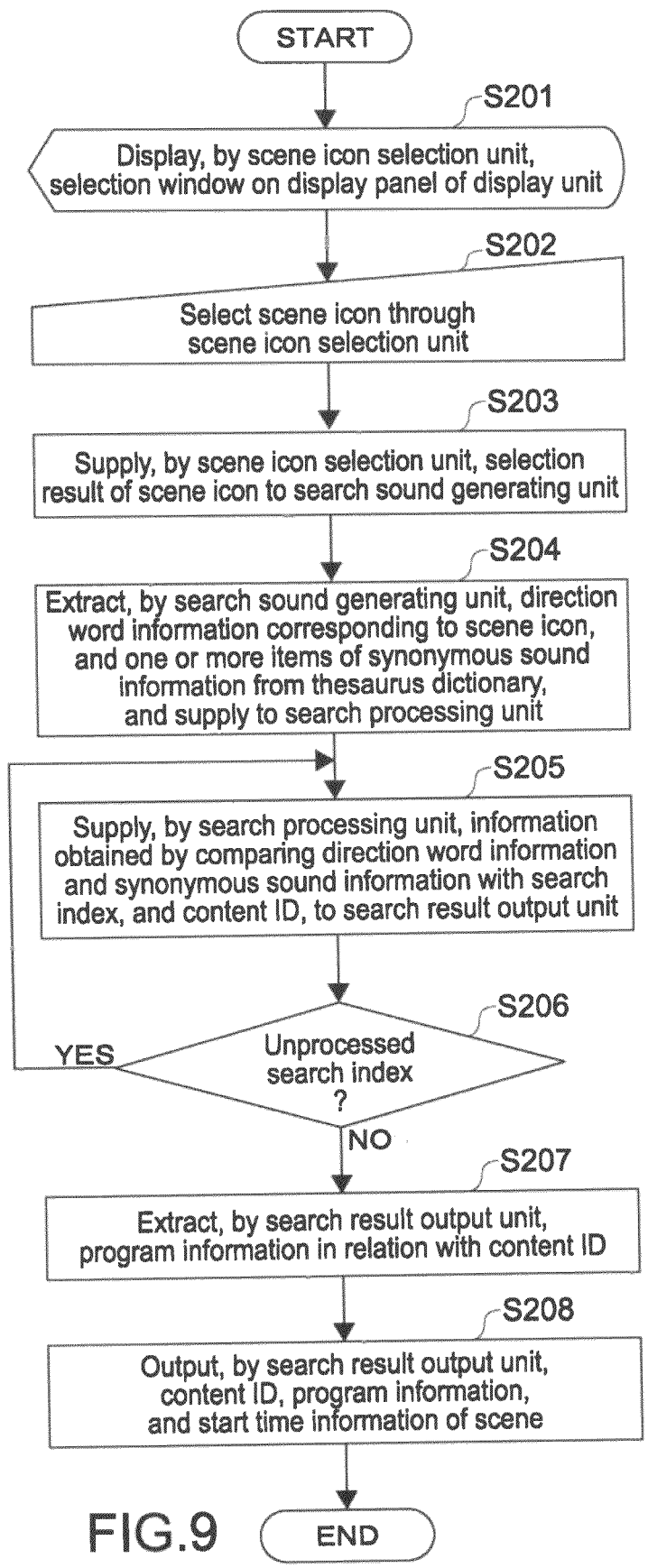
FIG. 9 is a flowchart showing operations of scene search.

FIG. 9 is a flowchart showing operations of scene search.

First, the scene icon selection unit 111 displays a selection window including one or more scene icons and direction words on the display panel of the display unit 607 to show them a user (Step S201). The user selects a scene icon corresponding to a desired scene content out of the one or more scene icons displayed on the display panel of the display unit 607 through the scene icon selection unit 111 (Step S202). Receiving a selection result of the scene icon 101b by the user, the scene icon selection unit 111 supplies the selection result to the search sound generating unit 113 (Step S203).

Then, the search sound generating unit 113 extracts direction word information corresponding to the scene icon selected by the user through the scene icon selection unit 111, and one or more items of synonymous sound information from the thesaurus dictionary 112a, and supplies the direction word information and the one or more items of synonymous sound information to the search processing unit 120 (Step S204).

Then, the search processing unit 120 compares the direction word information and the one or more items of synonymous sound information supplied from the search sound generating unit 113 with the search index 143a for each sound stream stored in the search index storing unit 146. Specifically, the search processing unit 120 compares a string of sound unit components forming a direction word with an array of sound unit components in the time order in the field of the sound unit component in the search index 143a, and searches an array of sound unit components satisfying a predetermined degree of coincidence in the search index 143a. The search processing unit 120 extracts, from the search index 143a, start position information corresponding to an initial sound unit component in the array of sound unit components searched from the search index 143a. Further, the search processing unit 120 calculates a score of the sound unit components searched from the search index 143a. The search processing unit 120 supplies, together with the start position information extracted from the search index 143a and the score obtained by the calculation, the content ID in relation with the sound stream before conversion to the search result output unit 130 (Step S205).

The search processing unit 120 performs this processing for each of the one or more items of synonymous sound information supplied from the search sound generating unit 113. Finishing the processing with respect to the direction word information and all the one or more items of synonymous sound information supplied from the search sound generating unit 113, then, the search processing unit 120 performs the chain of processing with respect to the search index 143a of a sound stream with which another content ID is in relation (Yes in Step 206). The search processing unit 120 performs the chain of processing for all the search indexes 143a of sound streams with which different content IDs are in relation (No in Step S206).

Then, the search result output unit 130 extracts, based on the content ID supplied from the search processing unit 120, the program title, the content title in the removal media 615, and the program information such as a name of the content delivery server 618 or the broadcast station 608 and delivery date and time, which are stored in the transport stream storing unit 152 in relation with the content ID (Step S207). The search result output unit 130 extracts, for example, the start position information on one or more scenes based on the content ID and the score of the sound unit component supplied from the search processing unit 120. The search result output unit 130 outputs the content ID supplied from the search processing unit 120, the content information stored in the transport stream storing unit 152 in relation with the content ID, and the start position information on one or more scenes (Step S208).

In this embodiment, the search index generating unit 143 determines the sound unit component, calculates a score, which is a value of probability of the determination result of the sound unit component, and stores the sound unit component in the search index storing unit 146, but not limited to the above. The search index generating unit 143 may determine a sound wave shape pattern, may calculate a score, which is a value of probability of the determination result of the sound wave shape pattern, and may store the sound wave shape pattern in the search index storing unit 146.

According to this embodiment, sound information in relation with a scene icon symbolizing a scene content and expressing the scene content is specified by a user as a scene search condition, and a scene search is performed. So a variation in determining sound information being the scene search condition by a user is not generated, and a scene of a desired attribute can be searched with high accuracy. A user can select sound information being the search condition through displayed scene icons. Accordingly, the user can select the sound information more intuitively. Further, the direction word and the one or more synonymous sounds corresponding to the scene icon are registered in the thesaurus dictionary. So the scene search can be performed based on a plurality of kinds of sound information without increasing a burden of a user. Further, selecting a scene icon displayed on the display panel, the operations of scene search are performed. So a desired scene can be searched out of the plurality of scene contents respectively symbolized by the plurality of scene icons.

Second Embodiment

Next, a description will be given on an information terminal 2 as an information processing apparatus according to a second embodiment of the present invention.

In the following description, descriptions of configurations, functions, and the like similar to those of the first embodiment will be omitted or shortened, and different parts will mainly be described. In this embodiment, units of the information terminal 2 having configurations similar to the units of the information terminal 1 are denoted by corresponding reference symbols (200s), and the overlapping description will be omitted.

(Software Configuration of Information Terminal 2)

A description will be given on the software configuration of the information terminal 2.

Figure 10:
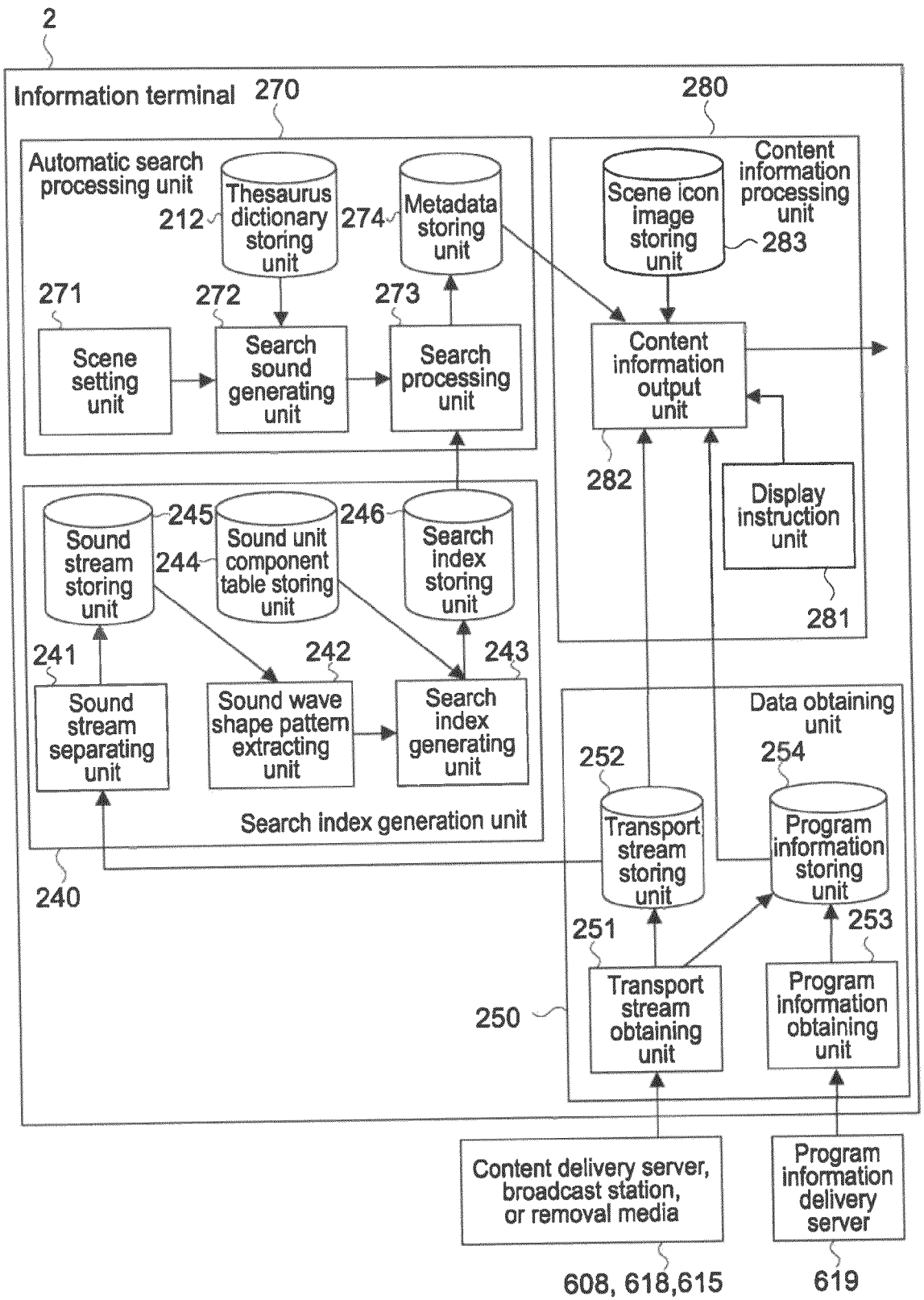
FIG. 10 is a block diagram showing a software configuration of an information terminal according to a second embodiment of the present invention.

FIG. 10 is a block diagram showing the software configuration of the information terminal 2.

The information terminal 2 includes a search index generation unit 240, a data obtaining unit 250, an automatic search processing unit 270, and a content information processing unit 280.

(Configuration of Data Obtaining Unit 250)

The data obtaining unit 250 includes a transport stream obtaining unit 251 and a transport stream storing unit 252 similar to those of the data obtaining unit 150 of the first embodiment, a program information obtaining unit 253, and a program information storing unit 254.

The program information obtaining unit 253 obtains program information delivered by the program information delivery server 619 via the network 617, and stores the program information in the program information storing unit 254. The program information is information including a program title, a program comment, a broadcast station, delivery date and time, and the like, and includes information required to generate a program guide. The program guide is an electronic program guide (EPG) including information to guide viewing of a program supplied by the content delivery server 618 or the broadcast station 608. The program information obtaining unit 253 stores and controls information on the program guides of a past predetermined number of days in the program information storing unit 254. The number of days for which the program guide is stored in the program information storing unit 254 can be arbitrarily set by a user.

The transport stream obtaining unit 251 additionally stores the content ID in the program information storing unit 254 in relation with the program information on the corresponding content in the program guide information.

(Configuration of Automatic Search Processing Unit 270)

The automatic search processing unit 270 includes a search sound generating unit 272 (sound information generating unit), a thesaurus dictionary storing unit 212, and a search processing unit 273 similar to those of the information terminal 1 of the first embodiment, a scene setting unit 271 (specifying unit), and a metadata storing unit 274.

The scene setting unit 271 displays a scene selection window including a plurality of scene icons symbolizing different scene contents, respectively, on the display panel of the display unit 607 to show them a user, causes the user to select one or more scene icons corresponding to a desired (search-target) scene content thereamong, and receives the selection result. The scene setting unit 271 determines a scene icon ID in correspondence with the scene icon selected by a user, and supplies the scene icon ID to the search sound generating unit 272. Note that an interface with which a user selects a scene content is not limited to the scene icon, but may be a direction word or the like expressing the scene content as a character string.

The search sound generating unit 272 extracts sound information being a string of the sound unit components forming a direction word corresponding to the scene icon ID supplied from the scene setting unit 271 and sound information being strings of the sound unit components forming one or more synonymous sounds from the thesaurus dictionary 112a, and supplies the sound information to the search processing unit 273 together with the supplied scene icon ID.

The search processing unit 273 compares, for each scene icon ID supplied from the search sound generating unit 272, the sound information being a string of the sound unit components forming a direction word in relation with the scene icon ID and sound information being strings of the sound unit components forming one or more synonymous sounds with the search index 143*a* for each sound stream stored in the search index storing unit 246, and searches an array of sound unit components satisfying a predetermined degree of coincidence in the search index 143*a*. The search processing unit 273 extracts, from the search index 143*a*, start position information corresponding to an initial sound unit component in the array of sound unit components searched from the search index 143*a*. Further, the search processing unit 273 calculates a score of the sound unit components searched from the search index 143*a*. The search processing unit 273 repeats the above-mentioned processing with respect to the direction word information in relation with the scene icon ID and all the one or more items of synonymous sound information. Then, the search processing unit 273 stores information, in which the obtained start position and the score are in relation with each other, in the metadata storing unit 274 as metadata for each scene icon ID in relation with the scene icon ID. The search processing unit 273 performs this processing with respect to all the scene icon IDs supplied from the search sound generating unit 272. Accordingly, as shown in FIG. 11, metadata for each sound stream is obtained, and is stored in the metadata storing unit 274 in relation with the content ID of the sound stream.

Figure 11:
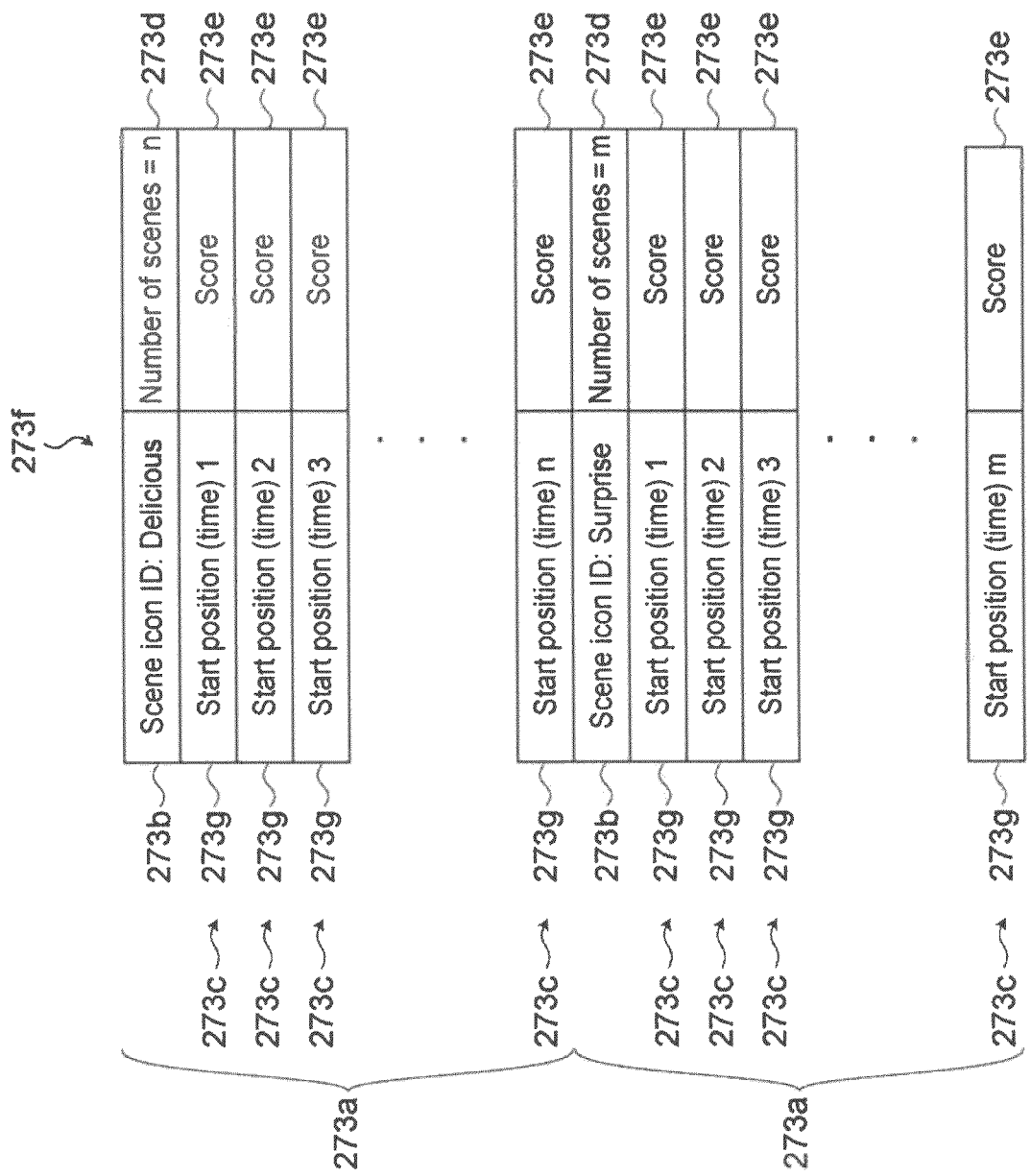
FIG. 11 is a diagram showing a structure of a metadata.

FIG. 11 is a diagram showing a structure of the metadata.

A scene icon ID 273*b*, metadata 273*c* for each scene icon ID, the number of scenes 273*d* for each scene icon ID, and the like constitute a metadata 273*a* for each scene icon ID 273*b*. Here, the number of scenes 273*d* for each scene icon ID shows the number of pairs of start position information 273*g* and a score 273*e* included in the metadata 273*c* for each scene icon ID. The way to use the start position information will be described later. One or more items of metadata 273*a* for the one or more scene icon IDs set by the scene setting unit 271, respectively, constitute metadata 273*f* for each sound stream.

(Configuration of Content Information Processing Unit 280)

The content information processing unit 280 includes a display instruction unit 281, a content information output unit 282, and a scene icon image storing unit 283.

The display instruction unit 281 receives an instruction to display a program guide on the display panel of the display unit 607 and an instruction of a past date and time of the program guide to be displayed from a user. The display instruction unit 281, for example, displays a predetermined instruction window on the display panel of the display unit 607. A user can input an instruction to display a program guide on the display panel of the display unit 607 and an instruction of a past date and time of the program guide to be displayed through the input operation unit 605. The display instruction unit 281 receives the instruction to display a program guide and the instruction of a past date and time of the program guide to be displayed from a user, and notifies the content information output unit 282 of the instructions. Further, the display instruction unit 281 receives an instruction of a detailed information display (described later) with respect to a specific content from a user, or an instruction to convert the display to a different detailed information display.

Receiving the instruction to display a program guide and the instruction of a past date and time of the program guide to be displayed from the display instruction unit 281, the content information output unit 282 extracts program information on a content of the corresponding date and time and a content ID in relation with the program information from the program guide information stored in the program information storing unit 254 based on the date and time in the instruction. The content information output unit 282 extracts metadata for each corresponding sound stream from the metadata storing unit 274 based on the extracted content ID. The content information output unit 282 extracts a scene icon ID from the metadata for each sound stream extracted from the metadata storing unit 274 based on a predetermined rule. As the predetermined rule, for example, in a case where the number of scenes of each scene icon ID is equal to or larger than a threshold, the scene icon ID may be extracted. Alternatively, in a case where the average value of the scores is equal to or larger than a threshold, the scene icon ID may be extracted.

The scene icon image storing unit 283 stores one or more scene icon images respectively symbolizing different scene contents in relation with the scene icon IDs. The content information output unit 282 extracts a scene icon image in relation with the scene icon ID, which is extracted from the metadata 273*a* based on the predetermined rule, from the scene icon image storing unit 283.

Then, the content information output unit 282 generates program guide information by, for example, arranging, to program information corresponding to a content ID, a scene icon image corresponding to the scene icon ID, and outputs the result. The display unit 607 displays a program guide window 282*a* on the display panel of the display unit 607 based on the information output by the content information output unit 282. For example, on a program guide including program information including program titles, program comments, broadcast stations, delivery dates and times, and the like on the program guide window 282*a*, scene icons are respectively arranged for program information on contents. According to the predetermined rule, one or more scene icons are displayed in relation with one item of program information, or no scene icon is displayed. On the program guide window 282*a*, content information and a scene icon image symbolizing the scene content can be displayed in combination. So, in displaying which content includes which scene content, a user can understand that more intuitively.

Figure 12:
FIG. 12 is a diagram showing a program guide window.

FIG. 12 is a diagram showing the program guide window 282*a*.

In FIG. 12, on the program guide window 282*a*, with regard to a predetermined content, program information including a content title "Variety program H", a channel "7ch (channel)", a broadcast station "G TV", a broadcast start time "17:00", and the like is displayed, and a scene icon symbolizing a "laughter scene" and a scene icon symbolizing a "wonder scene" are arranged.

Further, the content information output unit 282 may search a transport stream of a predetermined length from a start position of a scene in relation with the scene icon from the transport stream storing unit 252, and may output the transport stream so as to display the transport stream on the display panel of the display unit 607 as a thumbnail 282*b*. Note that in FIG. 12, the thumbnail 282*b* is represented by a rectangular and the detailed drawing is omitted.

Note that in FIG. 12, an EPG (Electronic Program Guide) is exemplarily employed as the program guide, but not limited to the above. Alternatively, an ECG (Electronic Contents Guide) as to contents capable of being obtained via IP multicast may be employed as the program guide.

Each of scene icons displayed for each content on the program guide window 282*a* is in relation with a content ID of a content corresponding to the field of the program guide in which the scene icon is arranged. Through an operation with respect to a predetermined scene icon displayed on the display panel of the display unit 607 by using the input operation unit 605 by a user, for example, through a click of the icon, an instruction to change the display from the display of the program guide to the display of a detailed information with respect to the content of the content ID in relation with the operated scene icon can be input. The display instruction unit 281 receives the instruction to change the display by a user, and notifies the content information output unit 282 of this instruction. Receiving the instruction to change the display from the display instruction unit 281, the content information output unit 282 generates, based on the content ID in relation with the instructed content, first display information for displaying a detailed information display window 282*c* including detailed information on the content ID, and outputs the first display information. On the detailed information display window 282*c*, information such as, for example, a broadcast station, a program title, a broadcasting hour, casts, and detailed information, which is further detailed compared to the program information displayed on the program guide window 282*a*, the thumbnail 282*b*, and the like are displayed. The detailed information display window 282*c* further includes a scene detailed information display belt 282*d*. The scene detailed information display belt 282*d* is used to display which position in a predetermined time slot (for example, from a program start time to a program end time) in a content includes a predetermined scene content by using a scene icon symbolizing the scene content.

The content information output unit 282 displays the scene detailed information display belt 282*d* as follows. The content information output unit 282 extracts, based on a content ID of a content whose detailed information is displayed on the detailed information display window 282*c*, the metadata 273*a* which is stored in relation with the content ID. The content information output unit 282 extracts, based on a predetermined rule, one or more items of start position information 273*g* and a scene icon ID of the metadata 273*c* including the start position information 273*g* such that they are in relation with each other from the metadata 273*a* extracted from the metadata storing unit 274. As the predetermined rule, for example, the start position information 273*g* forming a pair with the score 273*e* equal to or larger than a threshold, and a scene icon ID of the metadata 273*c* including the start position information 273*g* may be extracted in relation with each other. Based on the start position information 273*g* and the scene icon ID extracted from the metadata 273*a*, the content information output unit 282 generates, at a position corresponding to the start position information 273*g* of the time slot of the scene detailed information display belt 282*d*, the first display information for displaying a scene icon in relation with the scene icon ID, and outputs the result.

Figure 13:
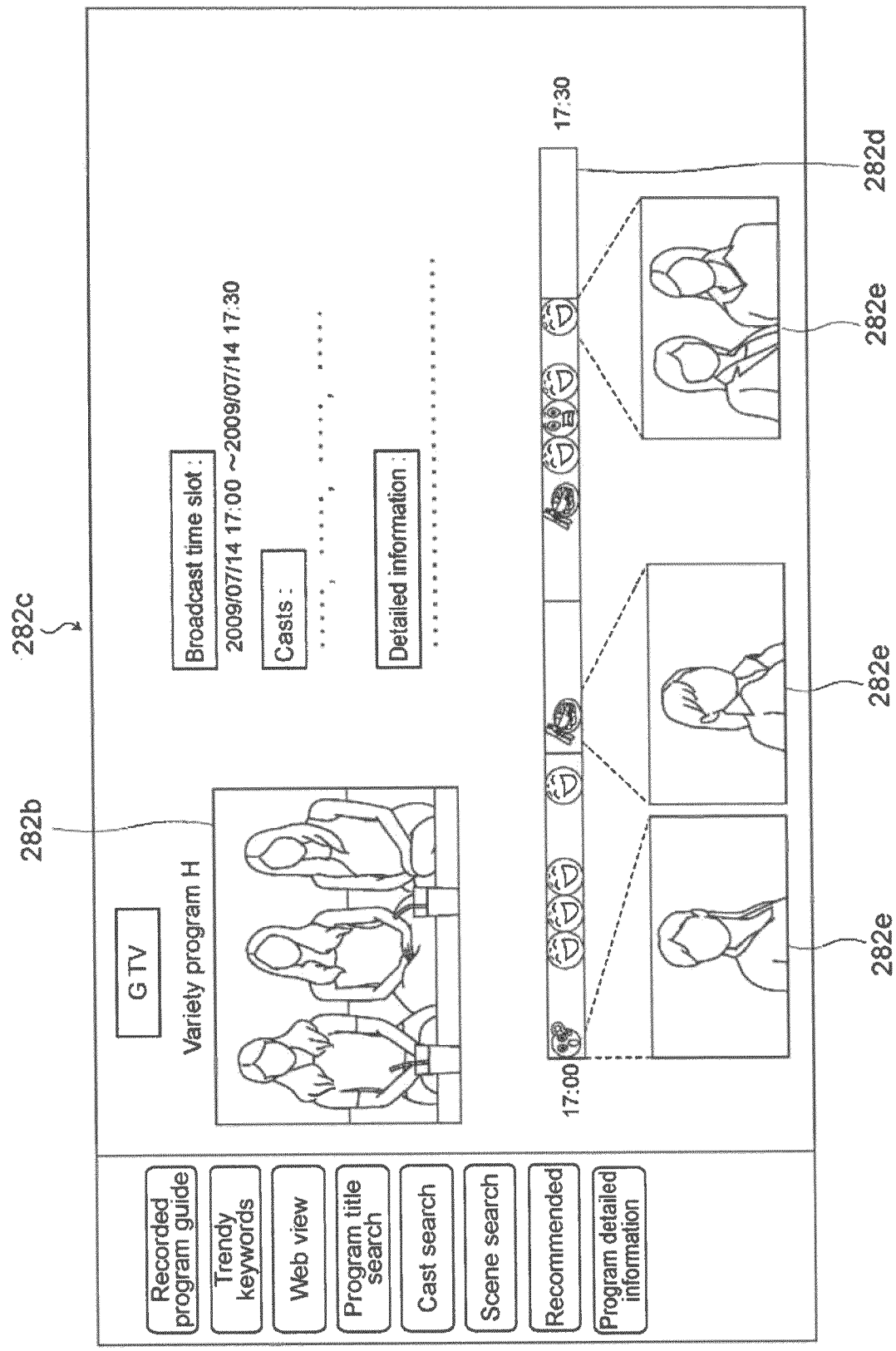
FIG. 13 is a diagram showing a detailed information display window.

FIG. 13 is a diagram showing the detailed information display window 282*c*.

In FIG. 13, on the detailed information display window 282*c*, for example, program information including a broadcast station "G TV", a content title "Variety program H", a broadcast time slot "2009/08/05 17:00-2009/08/05 17:30", casts, detailed information, and the like, the scene detailed information display belt 282*d*, and the thumbnail 282*b* are displayed. On the scene detailed information display belt 282*d*, based on the start positions of the scene contents, one or more scene icons symbolizing a "wonder scene", one or more scene icons symbolizing a "laughter scene", one or more scene icons symbolizing a "delicious scene", and one or more scene icons symbolizing a "surprise scene" are arranged. On the detailed information display window 282*c*, content information, scene time information, and an image of a scene icon symbolizing the scene content can be displayed in combination. So, in displaying which scene content appears in which time slot in a content, a user can understand that more intuitively.

Each scene icon displayed on the scene detailed information display belt 282*d* is in relation with start position information on a scene content that the scene icon symbolizes. A user can perform a predetermined operation such as a click on a predetermined scene icon displayed on the scene detailed information display belt 282*d* by using the input operation unit 605. The display instruction unit 281 receives the instruction to display a thumbnail from a user, and notifies the content information output unit 282 of this instruction. Receiving the instruction from the display instruction unit 281, the content information output unit 282 searches, based on the start position information in relation with the operated scene icon, a transport stream of a predetermined length from the transport stream storing unit 252, and outputs the transport stream so as to be displayed on the display panel of the display unit 607 as a thumbnail 282*e*.

Alternatively, through a predetermined operation with respect to a predetermined scene icon displayed on the program guide window 282*a* by using the input operation unit 605 by a user, for example, through a click of the icon, the display may be changed from the display of the program guide to the display of a detailed information display window 282*f* whose design is different from the detailed information display window 282*c*. Receiving the instruction to change the display, the display instruction unit 281 notifies the content information output unit 282 of the instruction. Receiving the instruction to change the display from the display instruction unit 281, based on the instructed content ID, the content information output unit 282 outputs second display information for displaying the detailed information display window 282*f* including detailed information with regard to the content ID. On the detailed information display window 282*f*, for example, information in detail including the broadcast station, the program title, the broadcast time slot, the casts, and detailed information, and the thumbnail 282*b* are displayed. The detailed information display window 282*f* further includes a scene analysis display area 282*g*. The scene analysis display area 282*g* is an area for displaying the number of times and the like of a predetermined scene content included in the content by using a scene icon symbolizing the scene content.

The content information output unit 282 displays the scene analysis display area 282*g* as follows. Based on the content ID of the content whose detailed information is displayed on the detailed information display window 282*f*, the content information output unit 282 extracts the metadata 273*a* stored in relation with the content ID. From the metadata 273*a* extracted from the metadata storing unit 274, the content information output unit 282 calculates and extracts the number of scenes corresponding to each scene icon ID based on a predetermined rule. As the predetermined rule, for example, out of the scores 273*e* registered in relation with each scene icon ID, the number of the scores 273*e* equal to or larger than a threshold may be extracted in relation with the scene icon ID. Based on the number of the scores 273*e* equal to or larger than the threshold and the scene icon ID in relation therewith extracted from the metadata 273*a*, the content information output unit 282 generates the second display information for displaying the scene icons in relation with the scene icon ID, the number of the scene icons being equal to the number of the extracted scores 273*e* equal to or larger than the threshold, and outputs the result.

Figure 14:
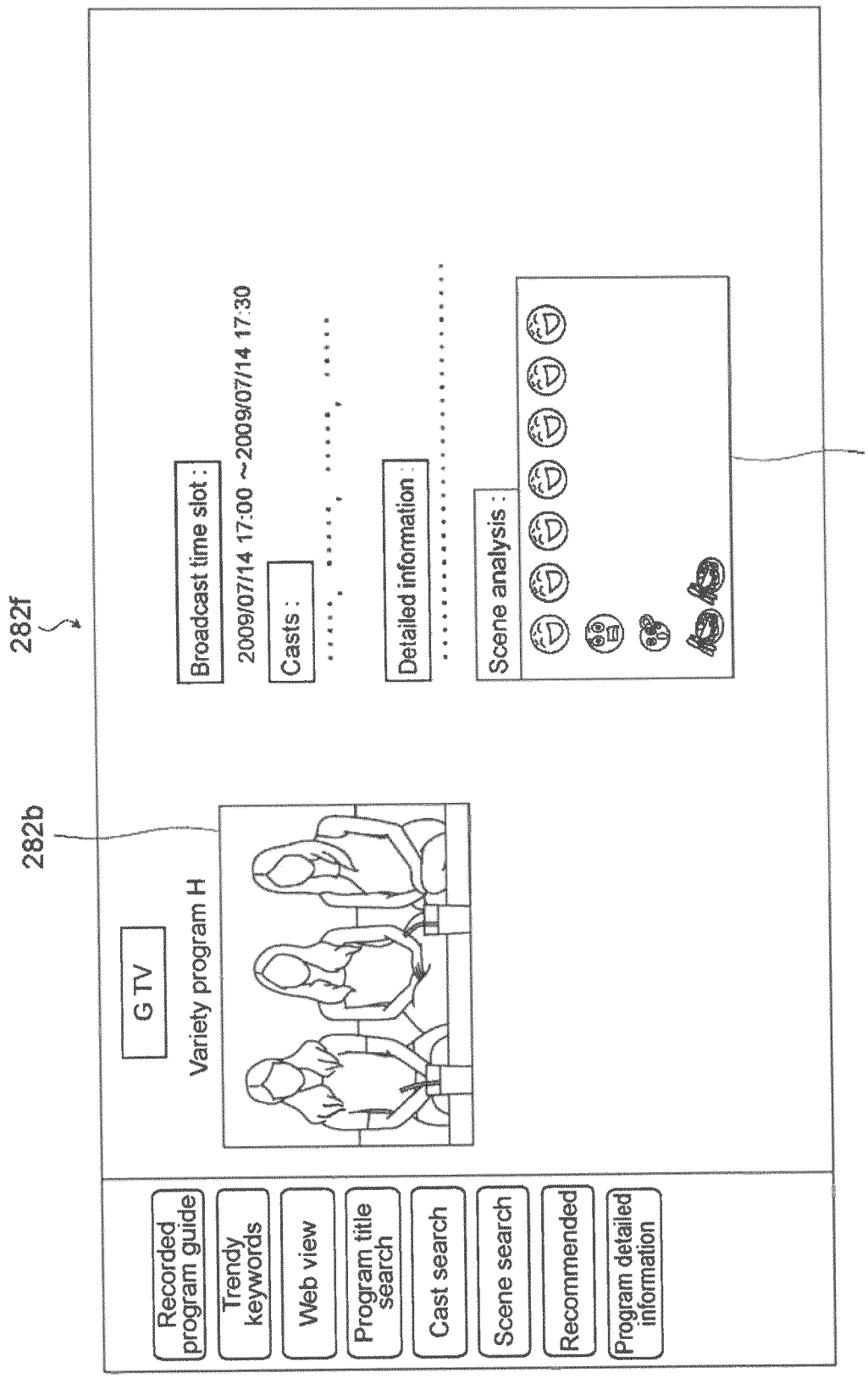
FIG. 14 is a diagram showing another detailed information display window.

FIG. 14 is a diagram showing the detailed information display window 282*f*.

In FIG. 14, on the detailed information display window 282*f*, for example, program information including a broadcast station "G TV", a content title "Variety program H", a broadcast time slot "2009/08/05 17:00-2009/08/05 17:30", casts, detailed information, and the like, the scene analysis display area 282g, and the thumbnail 282b are displayed. On the scene analysis display area 282g, the scene icons symbolizing a "laughter scene", the icon symbolizing a "surprise scene", the scene icon symbolizing a "wonder scene", and the scene icons symbolizing a "delicious scene", the number of each of the scene icons being same as the number output from the content information output unit 282, are arranged. On the detailed information display window 282f, content information and an image of a scene icon symbolizing the scene content can be displayed in combination. So, in displaying which scene content appears in which content, a user can understand that more intuitively.

(Operations of Information Terminal 2)

Next, a description will be given on operations of the information terminal 2. The description on the operations will be given in the following order.

(1) Operations of automatic search processing
(2) Operations of content information processing Note that, before the (1) operations of automatic search processing, operations of generating search index are performed by the search index generation unit 240. The operations are same as the operations of generating search index described in Step S101 to Step S106, so the description will be omitted.

(Operations of Automatic Search Processing)

A description will be given on (1) operations of automatic search processing.

Figure 15:
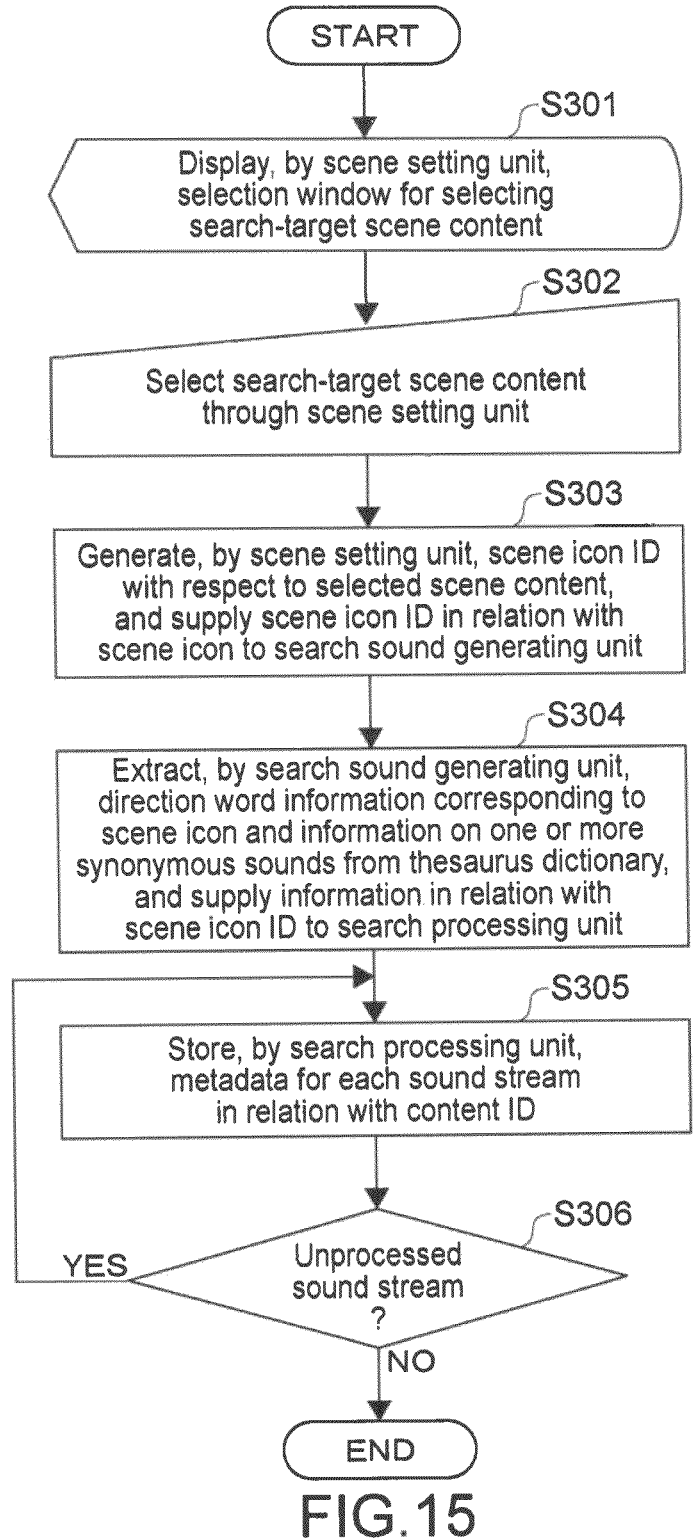
FIG. 15 is a flowchart showing operations of automatic search processing.

FIG. 15 is a flowchart showing operations of automatic search processing.

First, the scene setting unit 271 displays, for example, a scene selection window on the display panel of the display unit 607 to show them a user, and causes the user to select a search-target scene content (Step S301). The search-target scene content is selected through the scene setting unit 271 by the user (Step S302). With respect to the scene content selected by the user, the scene setting unit 271 generates a scene icon ID capable of uniquely identifying the scene content, and supplies the scene icon ID in relation with the corresponding scene icon to the search sound generating unit 272 (Step S303).

Next, the search sound generating unit 272 extracts a string of the sound unit components forming a direction word corresponding to the scene icon selected through the scene setting unit 271 by the user and a string of the sound unit components forming one or more synonymous sounds from the thesaurus dictionary 112a, and supplies the strings of the sound unit components to the search processing unit 273 in relation with the supplied scene icon ID (Step S304).

Next, the search processing unit 273 compares, for each scene icon ID supplied from the search sound generating unit 272, the string of the sound unit components forming a direction word in relation with the scene icon ID and the string of the sound unit components forming one or more synonymous sounds with the search index 143a for each sound stream stored in the search index storing unit 246, and searches an array of sound unit components satisfying a predetermined degree of coincidence in the search index 143a. The search processing unit 273 extracts, from the search index 143a, start position information corresponding to an initial sound unit component in the array of sound unit components searched from the search index 143a. Further, the search processing unit 273 calculates a score of the sound unit components searched from the search index 143a. The search processing unit 273 performs the above-mentioned processing with respect to the direction word information in relation with the scene icon ID and all the one or more items of synonymous sound information. Then, the search processing unit 273 stores information, in which the determined start position and the score are in relation with each other, in the metadata storing unit 274 as the metadata 273a for each scene icon ID in relation with the scene icon ID. The search processing unit 273 performs this processing with respect to all the scene icon IDs supplied from the search sound generating unit 272. Accordingly, metadata for each sound stream is obtained, and is stored in the metadata storing unit 274 in relation with the content ID of the sound stream (Step S305). The search processing unit 273 repeats this processing for each sound stream in relation with different content ID (Yes in Step S306). The search processing unit 273 performs this processing for all the sound streams in relation with different content ID (No in Step S306).

Note that, in this embodiment, the search sound generating unit 272 performs the processing with respect to the scene icon selected through the scene setting unit 271 by a user, but not limited to the above. The automatic search processing unit 270 may not include the scene setting unit 271. In this case, the search sound generating unit 272 extracts, with respect to all the scene icon IDs registered in the thesaurus dictionary 112a, a string of the sound unit components forming a direction word and a string of the sound unit components forming one or more synonymous sounds from the thesaurus dictionary 112a, and supplies the strings of the sound unit components to the search processing unit 273 in relation with the supplied scene icon ID.

(Operations of Content Information Processing)

A description will be given on (2) operations of content information processing.

Figure 16:
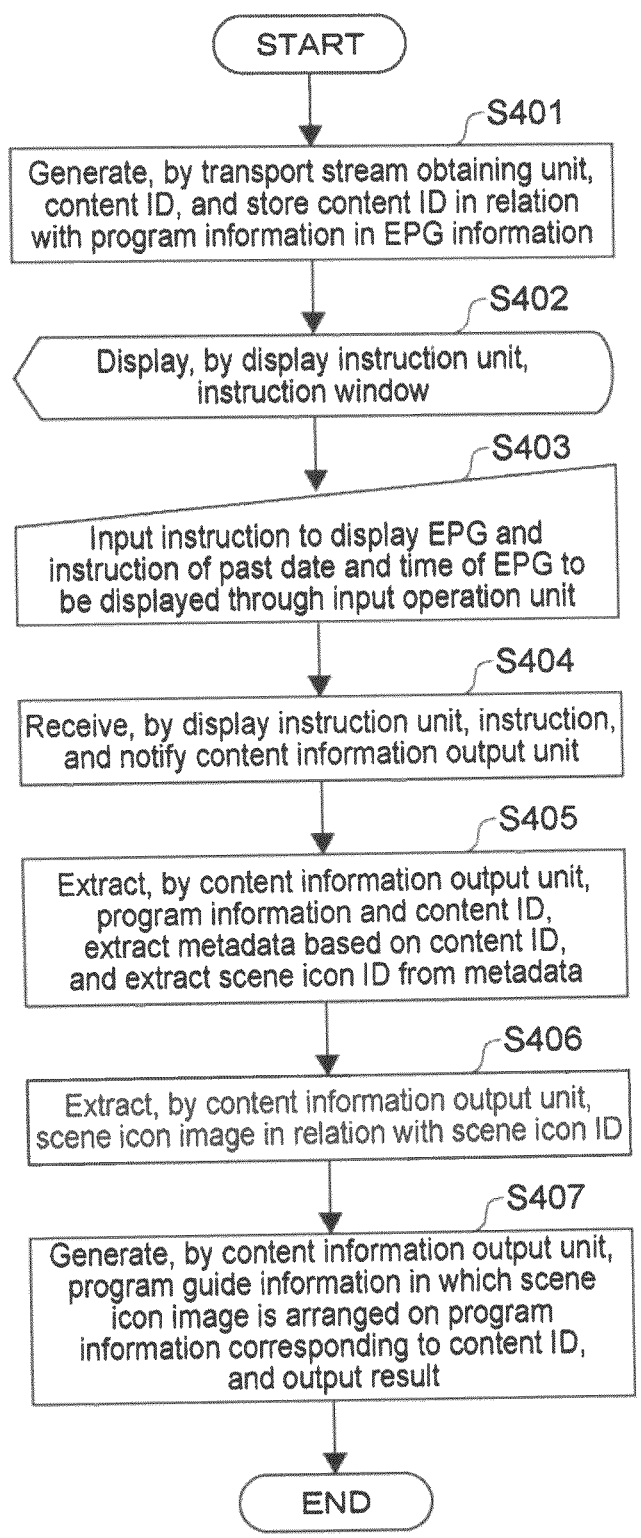
FIG. 16 is a flowchart showing operations of content information processing.

FIG. 16 is a flowchart showing operations of content information processing.

The transport stream obtaining unit 251 generates a content ID capable of uniquely identifying a transport stream, and additionally stores the content ID in relation with the corresponding program information in the information on the program guide obtained by the program information obtaining unit 253 and stored in the program information storing unit 254 (Step S401).

Meanwhile, the display instruction unit 281, for example, displays a predetermined instruction window on the display panel of the display unit 607 (Step S402). A user inputs an instruction to display a program guide on the display panel of the display unit 607 and an instruction of a past date and time of the program guide to be displayed through the input operation unit 605 (Step S403). The display instruction unit 281 receives the instruction to display a program guide and the instruction of a past date and time of the program guide to be displayed from a user, and notifies the content information output unit 282 of the instructions (Step S404).

Receiving the instruction to display a program guide and the instruction of a past date and time of the program guide to be displayed from the display instruction unit 281, the content information output unit 282 extracts program information on a content of the corresponding date and time and a content ID in relation with the program information from the program guide information stored in the program information storing unit 254 based on the date and time in the instruction. The content information output unit 282 extracts metadata for each corresponding sound stream from the metadata storing unit 274 based on the extracted content ID. The content information output unit 282 extracts a scene icon ID from the metadata for each sound stream extracted from the metadata storing unit 274 based on a predetermined rule (Step S405).

The content information output unit 282 extracts a scene icon image in relation with the scene icon ID, which is extracted from the metadata 273a, from the scene icon image storing unit 283 (Step S406).

Then, the content information output unit 282 generates program guide information by, for example, arranging, to program information corresponding to a content ID, a scene icon image corresponding to the scene icon ID, and outputs the result (Step S407).

According to this embodiment, a search result including a time position of a searched scene can be shown to a user. Because the user can understand the time position, the user can instruct the time position in inputting an instruction to reproduce a content. So a predetermined scene can be reproduced promptly. Sound information being a condition to search the scene can be previously set by a user, so, right after obtaining a content, the scene search processing can be performed. Further, by accumulating the scene search results, when a user wishes to refer to the search result, the user can refer to the search result promptly.

Third Embodiment

Next, a description will be given on a server-client system 8 having a configuration of an information processing apparatus according to a third embodiment of the present invention. The server-client system 8 includes a server apparatus 3 being a server and an information terminal 4 being a client. The server apparatus 3 is connected to the information terminal 4 via the network 617 such as the Internet or a home network. Note that, in FIG. 17, one information terminal 4 is shown, but not limited to the above. A plurality of information terminals 4 may be provided.

Figure 17:
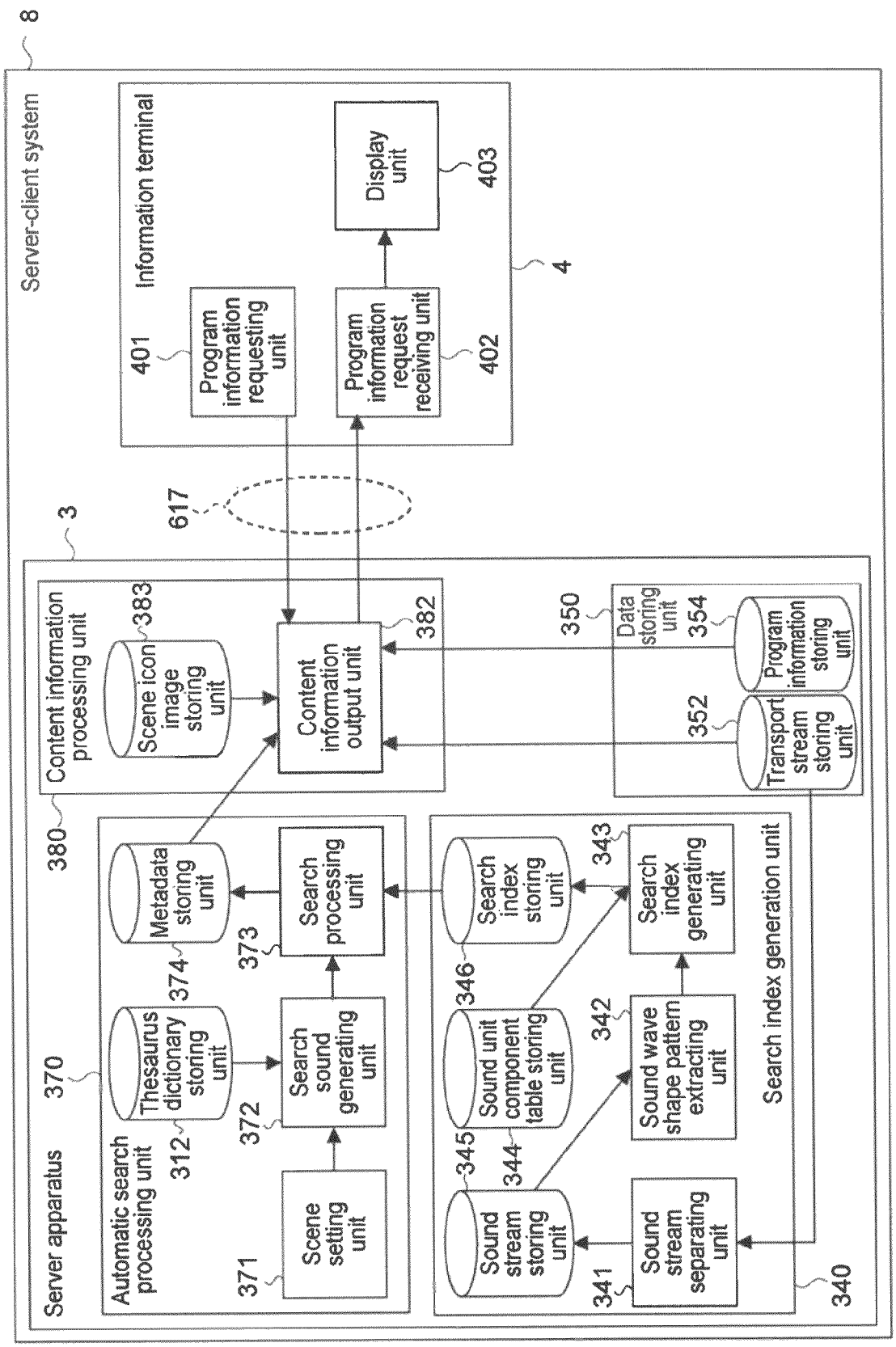
FIG. 17 is a block diagram showing a software configuration of a server apparatus and a software configuration of an information terminal according to a third embodiment of the present invention.

FIG. 17 is a block diagram showing a software configuration of the server apparatus 3 and a software configuration of the information terminal 4.

(Software Configuration of Server Apparatus 3)

First, a description will be given on a software configuration of the server apparatus 3.

The server apparatus 3 includes the units of the information terminal 2 of the second embodiment without the display instruction unit 281 of the content information processing unit 280. The configuration of the server apparatus 3 other than the display instruction unit 281 is similar to that of the information terminal 2. Units of the information terminal 3 having configurations similar to the units of the information terminal 2 are denoted by corresponding reference symbols (300s), and the overlapping description will be omitted.

Receiving a notification of an instruction of various kinds of display by a user from a program information requesting unit 401 (described later) of the information terminal 4 via the network 617, a content information output unit 382 generates information for displaying information on a scene icon image, and outputs the information to a program information request receiving unit 402 (described later) of the information terminal 4 via the network 617.

(Software Configuration of Information Terminal 4)

Next, a description will be given on a software configuration of the information terminal 4.

The information terminal 4 includes a program information requesting unit 401, a program information request receiving unit 402, and a display unit 403.

The display unit 403 includes a display device having a display panel such as an LCD, a display control circuit for driving the display device, and the like. The display unit 403 displays a program guide based on program guide information supplied from the server apparatus 3 on the display panel. Further, the display unit 403 displays confirmation of instructions and data input by a user, various statuses, and the like.

The program information requesting unit 401 receives instructions of various kinds of display on the display panel of the display unit 403 by a user, and notifies the content information output unit 382 of the server apparatus 3 of the instructions via the network 617.

The program information request receiving unit 402 obtains information for performing various kinds of display on the display panel of the display unit 403 from the content information output unit 382 of the server apparatus 3 via the network 617. Based on the information output from the content information output unit 382 of the server apparatus 3, the program information request receiving unit 402 performs display on the display panel of the display unit 403.

(Operations of Information Terminal 4)

Next, a description will be given on operations of the information terminal 4.

Figure 18:
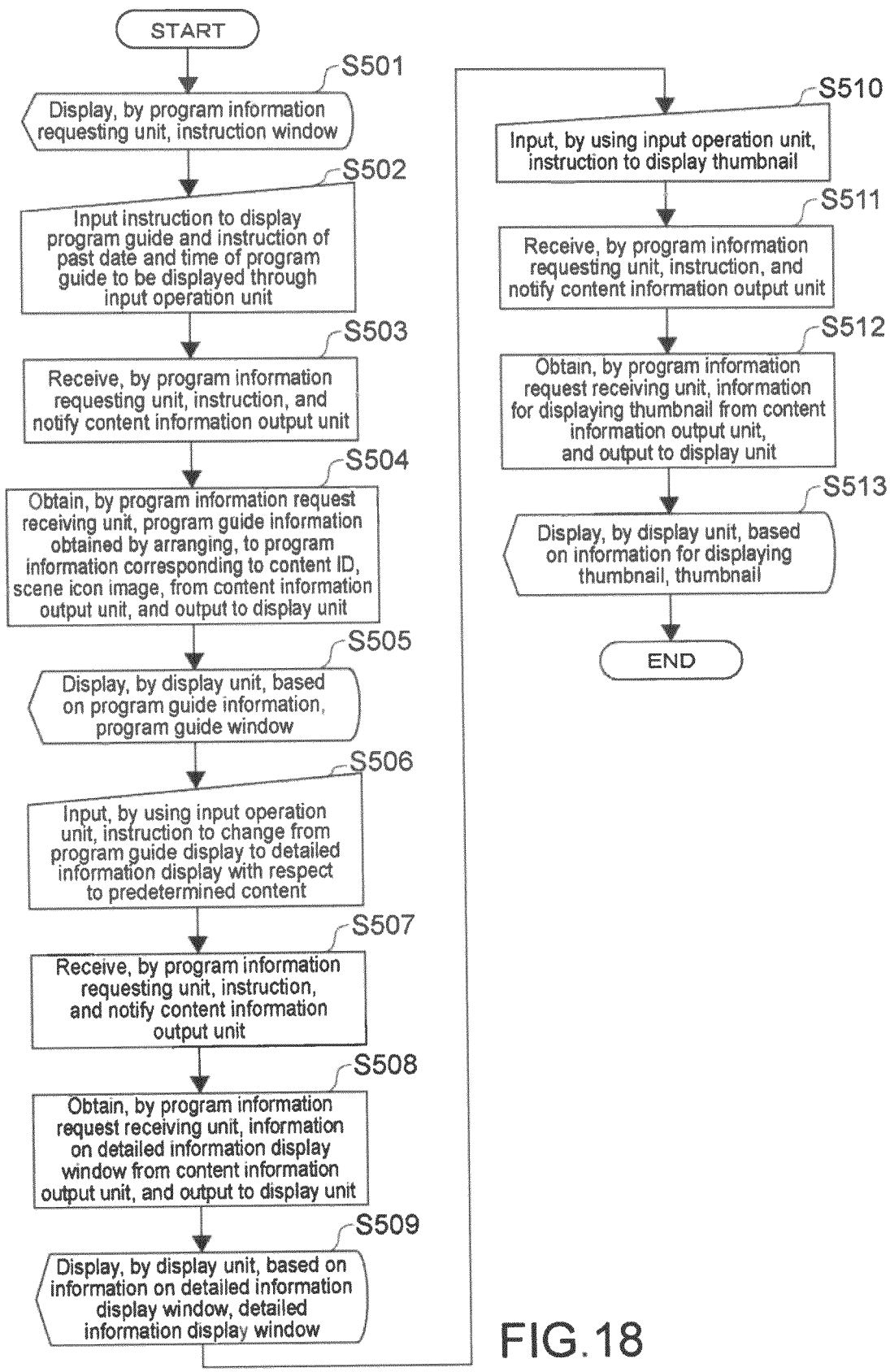
FIG. 18 is a flowchart showing operations of the information terminal of FIG. 17.

FIG. 18 is a flowchart showing operations of the information terminal 4.

First, the program information requesting unit 401 displays a predetermined instruction window on the display panel of the display unit 403 (Step S501). A user inputs an instruction to display a program guide on the display panel of the display unit 403 and an instruction of a past date and time of the program guide to be displayed through an input operation unit (Step S502). The program information requesting unit 401 receives the instruction to display a program guide and the instruction of a past date and time of the program guide to be displayed from a user, and notifies the content information output unit 382 of the server apparatus 3 of the instructions via the network 617 (Step S503).

Next, the program information request receiving unit 402 obtains program guide information, the program guide information being obtained by arranging, to program information corresponding to a content ID, a scene icon image corresponding to the scene icon ID, from the content information output unit 382 of the server apparatus 3 via the network 617, and outputs the program guide information to the display unit 403 (Step S504). Based on the program guide information from the program information request receiving unit 402, the display unit 403 displays the program guide window 282a on the display panel (Step S505). The program guide window 282a is, for example, similar to that of FIG. 12. On the program guide window 282a, a scene icon is arranged with respect to the program information for each content, and the content ID of the content corresponding to a column of the program guide on which the scene icon is arranged is in relation with each scene icon.

Through a predetermined operation with respect to a predetermined scene icon on the program guide window 282a displayed on the display panel of the display unit 403 by using the input operation unit by a user, for example, through a click of the scene icon, an instruction to change the display from the display of the program guide to the display of a detailed information with respect to the content of the content ID in relation with the operated scene icon is input (Step S506). The program information requesting unit 401 receives the instruction to change the display from the display of the program guide to the display of a detailed information with respect to a predetermined content by a user, and notifies the content information output unit 382 of the server apparatus 3 of the instruction including the content ID in relation with the content via the network 617 (Step S507).

Next, the program information request receiving unit 402 obtains information on the detailed information display window including detailed information with regard to the instructed content ID from the content information output unit 382 of the server apparatus 3 via the network 617, and outputs the information on the detailed information display window to the display unit 403 (Step S508). Based on the information on the detailed information display window from the program information request receiving unit 402, the display unit 403 displays the detailed information display window 282c on the display panel (Step S509). The detailed information display window 282c includes the scene detailed information display belt 282d and the like. The detailed information display window 282c, the scene detailed information display belt 282d, and the thumbnail 282e (described later) are similar to those shown in FIG. 13. Each scene icon displayed on the scene detailed information display belt 282d is in relation with the start position information of the scene content symbolized by the scene icon.

A user can perform a predetermined operation such as a click on a predetermined scene icon displayed on the scene detailed information display belt 282d by using the input operation unit, to thereby input an instruction to display a thumbnail of a scene content, the scene icon being in relation with the start position information of the scene content (Step S510). The program information requesting unit 401 receives the instruction to display a thumbnail of a scene content whose scene icon is in relation with the start position information from a user, and notifies the content information output unit 382 of the server apparatus 3 of the instruction via the network 617 (Step S511).

Next, based on the start position information in relation with the predetermined operation such as a click of the scene icon, the program information request receiving unit 402 obtains information for displaying a transport stream of a predetermined length searched from a transport stream storing unit 352 as the thumbnail 282e from the content information output unit 382 of the server apparatus 3 via the network 617, and outputs the information to the display unit 403 (Step S512). Based on the information from the program information request receiving unit 402, the display unit 403 displays the thumbnail 282e on the display panel (Step S513).

Note that in a case of changing the display from the display of the program guide to the display of the detailed information display window 282f whose design is different from the detailed information display window 282c, the operations of Step S501 to Step S509 may be performed.

According to this embodiment, the server apparatus 3 includes a thesaurus dictionary storing unit 312. So a server manager additionally registers a new scene icon ID, a new direction word, and a new synonymous sound with no difficulty, and they can be reflected to a plurality of information terminals 4. Further, the server apparatus 3 includes a scene icon image storing unit 383. So a server manager additionally registers a new scene icon with no difficulty, and it can be reflected to the plurality of information terminals 4.

Fourth Embodiment

Next, a description will be given on a server-client system 9 having a configuration of an information processing apparatus according to a fourth embodiment of the present invention. The server-client system 9 includes a server apparatus 5 being a server and an information terminal 7 being a client. The server apparatus 5 is connected to the information terminal 7 via the network 617 such as the Internet or a home network.

Figure 19:
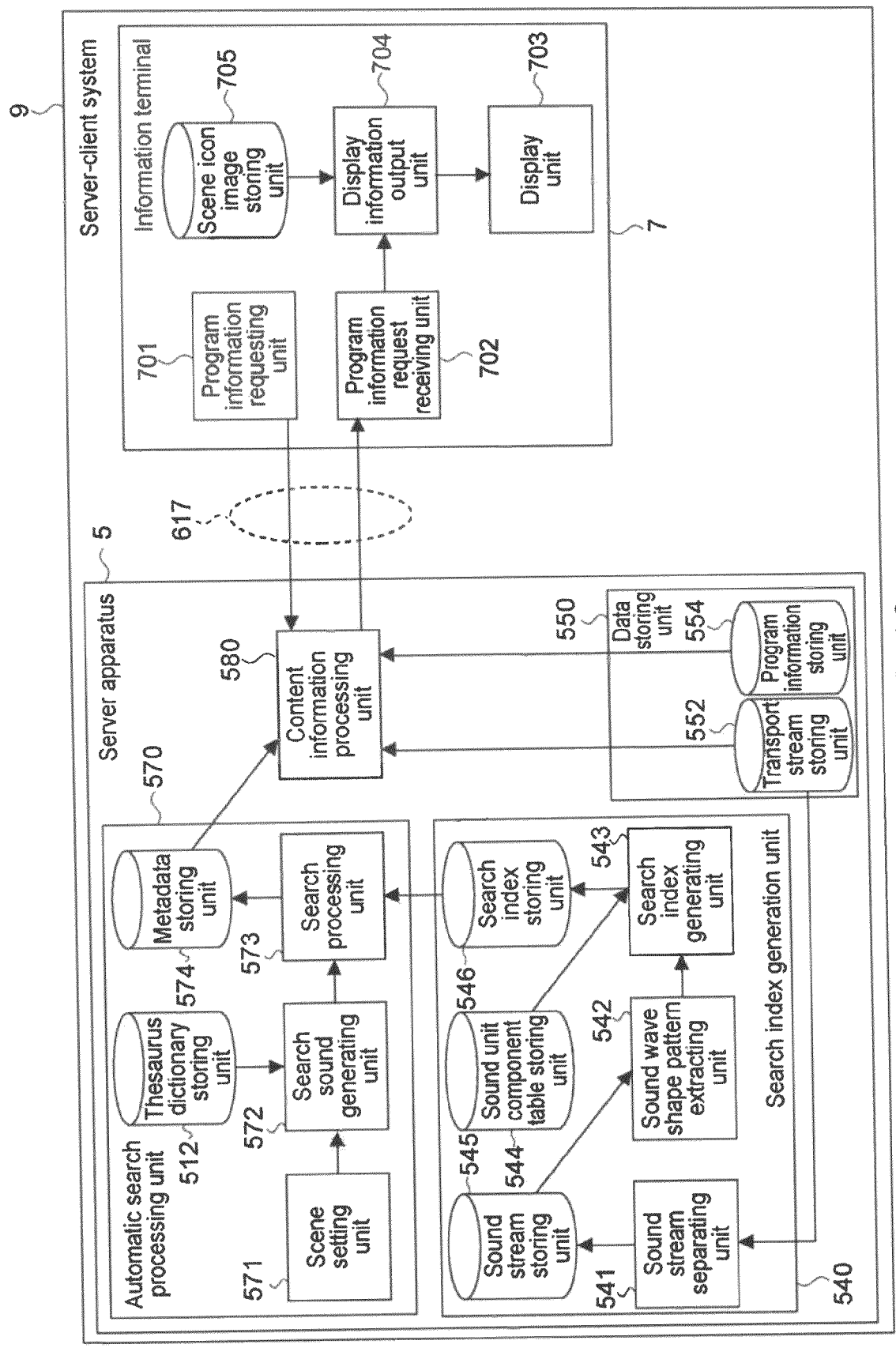
FIG. 19 is a block diagram showing a software configuration of a server apparatus and a software configuration of an information terminal according to a fourth embodiment of the present invention.

FIG. 19 is a block diagram showing a software configuration of the server apparatus 5 and a software configuration of the information terminal 7.

(Software Configuration of Server Apparatus 5)

First, a description will be given on a software configuration of the server apparatus 5.

The server apparatus 5 includes the units of the server apparatus 3 of the third embodiment without the scene icon image storing unit 383 of the content information processing unit 380. The configuration of the server apparatus 5 other than the scene icon image storing unit 383 is similar to that of the server apparatus 3. Units of the server apparatus 5 having configurations similar to the units of the server apparatus 3 are denoted by corresponding reference symbols (500s), and the overlapping description will be omitted.

Receiving a notification of an instruction of various kinds of display by a user from a program information requesting unit 701 (described later) of the information terminal 7 via the network 617, a content information output unit 580 generates information for display, and outputs the information to a program information request receiving unit 702 (described later) of the information terminal 7 via the network 617. While the content information output unit 382 of the third embodiment outputs information including a scene icon image in relation with a scene icon ID, the content information output unit 580 outputs information including a scene icon ID being an identification information on a scene icon instead of the scene icon image, which is different from the content information output unit 382.

(Software Configuration of Information Terminal 7)

Next, a description will be given on a software configuration of the information terminal 7.

The information terminal 7 includes the units of the information terminal 4 of the third embodiment, a display information output unit 704, and a scene icon image storing unit 705. Units of the information terminal 7 having configurations similar to the units of the information terminal 4 are denoted by corresponding reference symbols (700s), and the overlapping description will be omitted.

The program information request receiving unit 702 obtains information including a scene icon ID for generating information for performing display on the display panel of the display unit 703 from the content information output unit 582 of the server apparatus 5 via the network 617. The program information request receiving unit 702 outputs the information including the scene icon ID obtained from the content information output unit 580 of the server apparatus to the display information output unit 704.

The scene icon image storing unit 705 stores, similar to the scene icon image storing unit 383 of the third embodiment, one or more scene icon images each symbolizing a different scene content in relation with scene icon IDs, respectively, as the metadata 273a.

Based on the information including the scene icon ID from the program information request receiving unit 702, the display information output unit 704 extracts, from the scene icon image storing unit 705, a scene icon image in relation with the scene icon ID extracted from the metadata 273a based on a predetermined rule. Based on information including the scene icon ID obtained from the program information requesting unit 701, the display information output unit 704 generates information for performing display on the display panel of the display unit 703 by, for example, making the scene icon ID included in the information in relation with the extracted scene icon image, and performs display on the display panel of the display unit 703 based on the information.

(Operations of Information Terminal 7)

Next, a description will be given on operations of the information terminal 7.

Figure 20:
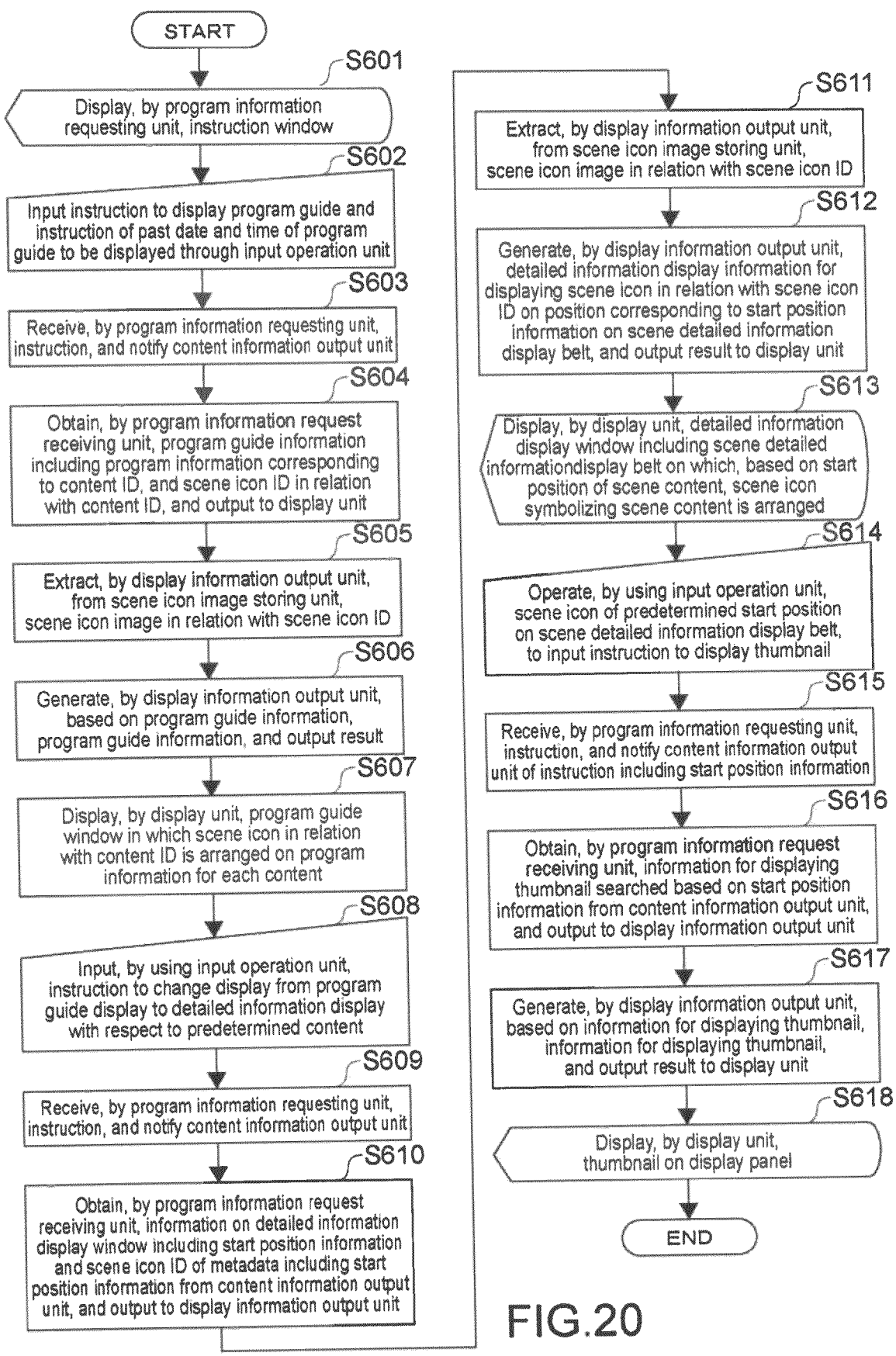
FIG. 20 is a flowchart showing operations of the information terminal of FIG. 19.

FIG. 20 is a flowchart showing operations of the information terminal 7.

First, the program information requesting unit 701 displays a predetermined instruction window on the display panel of the display unit 703 (Step S601). A user inputs an instruction to display a program guide on the display panel of the display unit 703 and an instruction of a past date and time of the program guide to be displayed through an input operation unit (Step S602). The program information requesting unit 701 receives the instruction to display a program guide and the instruction of a past date and time of the program guide to be displayed from a user, and notifies the content information output unit 580 of the server apparatus 5 of the instructions via the network 617 (Step S603).

Next, the program information request receiving unit 702 obtains program guide information including program information corresponding to a content ID, and a scene icon ID in relation with the content ID from the content information output unit 580 of the server apparatus 5 via the network 617, and outputs the information to the display unit 703 (Step S604).

The scene icon image storing unit 705 stores the one or more scene icon images each symbolizing a different scene content in relation with the scene icon IDs, respectively, as the metadata 273a. The display information output unit 704 extracts, from the scene icon image storing unit 705, a scene icon image in relation with the scene icon ID obtained from the program information request receiving unit 702 (Step S605). Next, based on the program guide information from the program information request receiving unit 702, the display information output unit 704 generates program guide information by, for example, arranging, to program information corresponding to a content ID, a scene icon image corresponding to the scene icon ID in relation with the content ID, and outputs the result to the display unit 703 (Step S606).

The display unit 703 displays the program guide window 282a on the display panel (Step S607). The program guide window 282a is, for example, similar to that of FIG. 12. For example, on a program guide including program information including program titles, program comments, broadcast stations, delivery dates and times, and the like on the program guide window 282a, scene icons are respectively arranged for program information on contents. Each scene icon is in relation with a content ID of a content corresponding to a column of the program guide on which the scene icon is arranged.

Through a predetermined operation with respect to a predetermined scene icon on the program guide window 282a displayed on the display panel of the display unit 703 by using the input operation unit by a user, for example, through a click of the scene icon, an instruction to change the display from the display of the program guide to the display of a detailed information with respect to the content of the content ID in relation with the operated scene icon is input (Step S608). The program information requesting unit 701 receives the instruction to change the display from the display of the program guide to the display of a detailed information with respect to a predetermined content by a user, and notifies the content information output unit 580 of the server apparatus 5 of the instruction including the content ID in relation with the content via the network 617 (Step S609).

Next, the program information request receiving unit 702 obtains information on the detailed information display window including detailed information with regard to the instructed content ID from the content information output unit 580 of the server apparatus 5 via the network 617, and outputs the result on the detailed information display window to the display information output unit 740 (Step S610). The detailed information includes information for generating the detailed information display window 282c including the scene detailed information display belt 282d. Here, the information for generating the scene detailed information display belt 282d includes the one or more items of start position information 273g extracted, based on a predetermined information, from the metadata 273a extracted from a metadata storing unit 574, and a scene icon ID of the metadata 273c including the start position information 273g.

The display information output unit 704 extracts, from the scene icon image storing unit 705, a scene icon image in relation with the scene icon ID obtained from the program information request receiving unit 702 (Step S611). Next, based on the information for generating the detailed information display window 282c, the display information output unit 704 generates detailed display information for displaying a scene icon in relation with the scene icon ID on a position corresponding to the start position information 273g on the scene detailed information display belt 282d, and outputs the result to the display unit 703 (Step S612).

The display unit 703 displays the detailed information display window 282c on the display panel (Step S613). The detailed information display window 282c is similar to that of FIG. 13. On the detailed information display window 282c, program information and the scene detailed information display belt 282d are displayed. On the scene detailed information display belt 282d, based on the start position of the scene content, one or more scene icons each symbolizing a different scene content are arranged. Each scene icon displayed on the scene detailed information display belt 282d is in relation with information on the start position of the scene content symbolized by the scene icon.

A user can perform a predetermined operation such as a click on a predetermined scene icon on the scene detailed information display belt 282d displayed on the display panel of the display unit 703 by using the input operation unit, to thereby input an instruction to display a thumbnail based on the start position information 273g in relation with a scene icon ID in relation with the operated scene icon (Step S614). The program information requesting unit 701 receives the instruction to display a thumbnail from a user, and notifies the content information output unit 580 of the server apparatus 5 of the instruction including the start position information 273g via the network 617 (Step S615).

Next, based on the start position information 273g, the program information request receiving unit 702 obtains information for displaying a transport stream of a predetermined length searched from a transport stream storing unit 552 as the thumbnail 282e from the content information output unit 580 of the server apparatus 5 via the network 617, and outputs the information to the display information output unit 704 (Step S616).

Based on the information for displaying a transport stream obtained from the program information request receiving unit 702 as the thumbnail 282e, the display information output unit 704 generates information for displaying the thumbnail 282e, and outputs the result to the display unit 703 (Step S617).

The display unit 703 displays the thumbnail 282e on the display panel (Step S618). The thumbnail 282e is, for example, similar to that of FIG. 13.

According to this embodiment, the server apparatus 5 transmits identification information on a scene icon to the information terminal 7. So, compared to the case of transmitting image information on an icon, the total data transfer amount can be reduced. Further, the information terminal 7 includes scene icon image storing unit 283. So each user can additionally register a desired scene icon image.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-248590 filed in the Japan Patent Office on Oct. 29, 2009, the entire content of which is hereby incorporated by reference.

What is claimed is:

1. An information processing apparatus, comprising: circuitry configured to
obtain at least one content including a sound;
store and display plural icons symbolizing plural scene contents, each icon being stored in association with plural sound information;
receive an icon selected by a user among the displayed plural icons, the selected icon being associated with selected plural sound information;
compare sound unit components of each of the selected plural sound information associated with the received icon selection with sound unit components generated from a sound wave shape pattern of the sound included in the at least one content, to thereby detect a content including any one of the selected plural sound information in the sound; and output information on the detected content including any one of the selected plural sound information,
wherein each of the icon is stored in association with direction word information that expresses the scene content symbolized by the corresponding icon with a character string, and
the sound unit components of the plural sound information express plural character strings, each of which expresses a semantic content similar to the semantic content of the character string in the direction word information.

2. The information processing apparatus according to claim 1,
wherein the circuitry is configured to display an icon and to receive a predetermined operation with respect to the icon from a user as an instruction to perform detection and as an instruction of the selected plural sound information to be detected with respect to the sound.

3. The information processing apparatus according to claim 2,
wherein the circuitry is configured to display a plurality of icons symbolizing different scene contents, respectively.

4. The information processing apparatus according to claim 3, wherein
the circuitry is configured to generate second sound information synonymous with first sound information, the first sound information being the selected plural sound information instructed by the icon selection, and
circuitry searches a content including, in the sound, each item of sound information out of the first sound information instructed by the icon selection and at least one item of the second sound information.

5. The information processing apparatus according to claim 4,
wherein the circuitry determines a time position of the sound corresponding to each item of sound information in the content, and
wherein the circuitry outputs the information on the content and information on the time position.

6. The information processing apparatus according to claim 1,
wherein the circuitry is configured to set the selected plural sound information prior to the circuitry obtaining the at least one content.

7. The information processing apparatus according to claim 6, wherein
the circuitry is configured to generate second sound information synonymous with first sound information, the first sound information being the selected plural sound information, and
circuitry searches a content including, in the sound, each item of sound information out of the first sound information and at least one item of the second sound information.

8. The information processing apparatus according to claim 7,
wherein the circuitry generates first display information by using the information on the at least one content and image information on the icon symbolizing the scene content, which is expressed by the selected plural sound information included in the sound in the content, and outputs the first display information.

9. The information processing apparatus according to claim 8,
wherein the circuitry determines a time position of the sound corresponding to the selected plural sound information in the content, and
wherein the circuitry generates second display information by using the information on the content, information on the time position, and the image information on the icon symbolizing the scene content expressed by the selected plural sound information, and outputs the second display information.

10. The information processing apparatus according to claim 7,
wherein the circuitry outputs the information on the at least one content and information identifying the icon symbolizing the scene content, which is expressed by the selected plural sound information included in the sound in the content.

11. The information processing apparatus according to claim 8,
wherein the circuitry determines a time position of the sound corresponding to the selected plural sound information in the content, and
wherein the circuitry outputs the information on the content, information on the time position, and information identifying the icon symbolizing the scene content expressed by the selected plural sound information.

12. The information processing apparatus according to claim 1, wherein
the circuitry determines a time position of the detected content including the selected plural sound information in the sound based on the comparison of the sound unit components of the selected plural sound information with the sound unit components of the sound, and
the circuitry outputs the determined time position of the detected content.

13. A scene search method, comprising:
obtaining at least one content including a sound;
storing and displaying plural icons symbolizing plural scene contents, each icon being stored in association with plural sound information;

receiving an icon selected by a user among the displayed plural icons, the selected icon being associated with selected plural sound information;

comparing sound unit components of each of the selected plural sound information associated with the received icon selection with sound unit components generated from a sound wave shape pattern of the sound included in the at least one content, to thereby detect a content including any one of the selected plural sound information in the sound; and outputting information on the detected content including any one of the selected plural sound information, wherein each of the icon is stored in association with direction word information that expresses the scene content symbolized by the corresponding icon with a character string, and the sound unit components of the plural sound information express plural character strings, each of which expresses a semantic content similar to the semantic content of the character string in the direction word information.

14. The scene search method according to claim 13, wherein the comparing includes determining a time position of the detected content including the selected plural sound information in the sound based on the comparison of the sound unit components of the selected plural sound information with the sound unit components of the sound, and the outputting includes outputting the determined time position of the detected content.

15. A non-transitory computer-readable storage medium storing computer-readable instructions thereon, which, when executed by a computer, cause the computer to execute a scene search method comprising:

Obtaining at least one content including a sound;

storing and displaying plural icons symbolizing plural scene contents, each icon being stored in association with plural sound information;

receiving an icon selected by a user among the displayed plural icons, the selected icon being associated with selected plural sound information;

comparing sound unit components of each of the selected plural sound information associated with the received icon selection with sound unit components generated from a sound wave shape pattern of the sound included in the at least one content, to thereby detect a content including any one of the selected plural sound information in the sound; and outputting information on the detected content including any one of the selected plural sound information, wherein each of the icon is stored in association with direction word information that expresses the scene content symbolized by the corresponding icon with a character string, and the sound unit components of the plural sound information express plural character strings, each of which expresses a semantic content similar to the semantic content of the character string in the direction word information.

16. The non-transitory computer-readable storage medium according to claim 15, wherein the comparing includes determining a time position of the detected content including the selected plural sound information in the sound based on the comparison of the sound unit components of the selected plural sound information with the sound unit components of the sound, and the outputting includes outputting the determined time position of the detected content.

* * * * *